(12) United States Patent
Jacob et al.

(10) Patent No.: US 8,491,929 B2
(45) Date of Patent: Jul. 23, 2013

(54) BIOADHESIVE POLYMERS

(75) Inventors: Jules Jacob, Yardley, PA (US); Avinash Nangia, Sharon, MA (US); James Yeh, Foxboro, MA (US); Vijayalakshmi Ramanan, Norwood, MA (US)

(73) Assignee: Vaunnex Inc., Sharon, MA (US)

( * ) Notice: Subject to any disclaimer, the term of this patent is extended or adjusted under 35 U.S.C. 154(b) by 806 days.

(21) Appl. No.: 11/922,430

(22) PCT Filed: Jun. 23, 2006

(86) PCT No.: PCT/US2006/024352
§ 371 (c)(1),
(2), (4) Date: Dec. 20, 2010

(87) PCT Pub. No.: WO2007/002318
PCT Pub. Date: Jan. 4, 2007

(65) Prior Publication Data
US 2011/0086095 A1 Apr. 14, 2011

Related U.S. Application Data

(60) Provisional application No. 60/693,601, filed on Jun. 23, 2005.

(51) Int. Cl.
*A61K 9/48* (2006.01)
*A61K 9/32* (2006.01)
*A61K 6/00* (2006.01)
*A61F 2/00* (2006.01)
*C08L 35/00* (2006.01)

(52) U.S. Cl.
USPC ........ 424/463; 424/423; 424/482; 514/772.1; 523/118; 525/183

(58) Field of Classification Search
USPC ........ 424/463, 423, 482; 514/772.1; 525/183; 523/118
See application file for complete search history.

(56) References Cited

U.S. PATENT DOCUMENTS
5,574,134 A 11/1996 Waite

FOREIGN PATENT DOCUMENTS
WO WO-01/10378 2/2001
WO WO 01/10378 A2 * 2/2001
WO WO 02/09767 A2 * 2/2002

* cited by examiner

*Primary Examiner* — Blessing Fubara
(74) *Attorney, Agent, or Firm* — Ropes & Gray LLP; David P. Halstead; David P. Pleynet

(57) ABSTRACT

Polymers and compositions, collectively "bioadhesive materials", with improved bioadhesive properties have been developed. One or more compounds comprising: a) an aromatic moiety comprising two or more hydroxyl substituents, methoxy substituents, substituents hydrolyzable to hydroxyl substituents, or a combination thereof, and b) a primary or secondary amino moiety are either covalently attached to a polymer or are physically mixed with a polymer to form a bioadhesive material. These bioadhesive materials can be used, for example, to fabricate new drug delivery or diagnostic systems with increased residence time at tissue surfaces, and consequently increase the bioavailability of a drug or a diagnostic agent.

6 Claims, 15 Drawing Sheets

BIOADHESIVE POLYMERS

RELATED APPLICATIONS

This application is a national stage filing under 35 U.S.C. 371 of International Application PCT/US2006/024352, filed Jun. 23, 2006, which claims the benefit of U.S. Provisional Application No. 60/693,601, filed Jun. 23, 2005, the contents of each of which are incorporated herein by reference in their entirety. International Application PCT/US2006/024352 was published under PCT Article 21(2) in English.

BACKGROUND OF THE INVENTION

Polymers that adhere well to biological surfaces ("bioadhesives") under a variety of conditions are useful in several branches of medicine. One important use of bioadhesive polymers is in drug delivery systems, particularly oral drug delivery. Such bioadhesive polymers, for example, certain polyanhydrides, are useful for slowing the passage of drug-containing materials through the gastrointestinal tract. U.S. Pat. No. 6,197,346 to Mathiowitz et al. describes using bioadhesive polymers that have high concentrations of carboxylic acid groups, such as polyanhydrides, to form microcapsules or as a coating on microcapsules that contain therapeutic or diagnostic agents.

Polyanhydrides are bioadhesive in vivo, for example in the gastrointestinal (GI) tract, and can significantly delay the passage of drug-containing particles through the GI tract, thus allowing more time for absorption of drug by the intestine. The mechanism causing the anhydride polymers or oligomers to be bioadhesive is believed to be a combination of the polymer's hydrophobic backbone coupled with the presence of carboxyl groups at the polymer ends. Interaction of charged carboxylate groups with tissue has been demonstrated with other bioadhesives. In particular, pharmaceutical industry materials considered to be bioadhesive typically are hydrophilic polymers containing carboxylic acid groups, and often containing hydroxyl groups as well. CARBOPOL™, a high molecular weight poly(acrylic acid) available from B.F. Goodrich, Co., is an example of a hydrophilic bioadhesive material. Other classes of bioadhesive polymers are characterized by having moderate to high densities of carboxyl substitution. The relatively hydrophobic anhydride polymers frequently demonstrate superior bioadhesive properties when compared with the hydrophilic carboxylate polymers. For example, hydrophilic bioadhesive polymers tend to lose their effectiveness when wet, and especially when wetting is prolonged. Their reduced adhesion to surfaces in vivo and in vitro tends to diminish their effectiveness in enhancing drug delivery.

Natural adhesives for underwater attachment of mussels, other bivalves and algae to rocks and other substrates are known (see U.S. Pat. No. 5,574,134 to Waite, U.S. Pat. No. 5,015,677 to Benedict et al., and U.S. Pat. No. 5,520,727 to Vreeland et al.). These adhesives are polymers containing poly(hydroxy-substituted) aromatic groups. In mussels and other bivalves, such polymers include dihydroxy-substituted aromatic groups, such as proteins containing 3,4-dihydroxyphenylalanine (DOPA). In algae, diverse polyhydroxy aromatics such as phloroglucinol and tannins are used. In adhering to an underwater surface, the bivalves secrete a preformed protein that adheres to the substrate thereby linking the bivalve to the substrate. After an initial adherence step, the natural polymers are typically permanently crosslinked by oxidation of adjacent hydroxyl groups.

Extraction of these materials from organisms is not practical for commercial scale production. Attempts to reproduce the adherence have been made, typically using synthetic or genetically engineered polypeptides containing amino acid motifs derived from mussel adhesives, or natural marine materials. The synthetic protein materials have proved to be too expensive, or otherwise inadequate, to sustain commercial applications. For example, U.S. Pat. No. 4,908,404 to Benedict et al., describes grafting 3,4-dihydroxyphenylalanine (DOPA) to polyamines. However, the adhesiveness of these cationic water-soluble compounds is not much better than that of the parent polyamines, such as poly-L-lysine.

Relatively hydrophobic polymers frequently demonstrate superior bioadhesive properties when compared with the hydrophilic polymers. Nevertheless, there is a continued need for polymers with improved bioadhesive properties, particularly when the polymers and/or the surfaces are wet. In addition, there is a continued need for drug delivery systems that increase residence time in the GI tract, nasal mucosa, pulmonary mucosa, vaginal mucosa and other mucosa in a cost-effective manner.

BRIEF SUMMARY OF THE INVENTION

Polymers and compositions with improved bioadhesive properties have been developed. Certain of these polymers and compositions are prepared with compounds that can be readily attached to a polymer backbone, if desired, and have a reduced probability of causing side effects (e.g., neurological side effects such as dopamine-associated toxicity) if the compounds are liberated from a polymer or composition.

Polymers with improved bioadhesive properties and methods for improving bioadhesion of polymers have been developed. A compound containing an aromatic group which contains one or more hydroxyl groups is grafted onto a polymer or coupled to individual monomers.

In one embodiment, the invention provides a bioadhesive polymer that includes a polymer backbone functionalized with residues of one or more compounds comprising:
  a) an aromatic moiety comprising two or more hydroxyl substituents, methoxy substituents, substituents hydrolyzable to hydroxyl substituents, or a combination thereof, and
  b) a primary or secondary amino moiety,
where the cumulative amount of the compound (i.e., compound not functionalized to a polymer backbone) that is converted to dopamine when infused into rat striatum is at least 65% less than for an equimolar amount of L-3,4-dihydroxyphenylalanine or where the blood-brain barrier is substantially impermeable to the compound.

In another embodiment, the invention provides a bioadhesive composition including a blend of a polymer and one or more compounds with:
  a) an aromatic moiety comprising two or more hydroxyl substituents, methoxy substituents, substituents hydrolyzable to hydroxyl substituents, or a combination thereof, and
  b) a primary or secondary amino moiety,
where the cumulative amount of the compound not functionalized to a polymer backbone that is converted to dopamine when infused into rat striatum is at least 65% less than for an equimolar amount of L-3,4-dihydroxyphenylalanine or where the blood-brain barrier is substantially impermeable to the compound. The polymers in such compositions are typically hydrophobic, but need not be adhesive.

Carbidopa or benserazide are peripheral decarboxylase enzyme inhibitors and are co-administered with levodopa to increase its level in the brain. Carbidopa and benserazide each do not cross the blood brain barrier to any significant extent and therefore do not exhibit any pharmacological or pharmacodynamic effect. Also, these two agents have good toxicological profiles. Therefore, a bioadhesive polymer or composition with a catechol functionality or other aromatic moiety comprising two or more hydroxyl substituents, methoxy substituents, substituents hydrolyzable to hydroxyl substituents, or a combination thereof that does not cross the blood brain barrier is a suitable polymer or composition of the invention.

The invention also provides compositions of the bioadhesive polymers and compositions described above, in combination with one or more bioadhesive modifiers, plasticizers and/or therapeutic, prophylactic, or diagnostic agents.

In addition, the invention provides methods of making these polymers and compositions and methods of prolonging contact of a pharmaceutical composition with a tissue by adding (e.g., as a coating) a bioadhesive polymer or composition of the invention to the pharmaceutical composition (e.g., a tablet or capsule).

Such bioadhesive polymers can be stabilized against erosion, particularly in the gastrointestinal environment, by incorporating one or more additives that stabilize the polymeric component from erosion, dissolution or both, where at least 50% by weight of a 1 mm thick film of the bioadhesive material remains after 12 hours in a buffered pH 4.5 dissolution bath. Typically, the additive is selected from (1) polyanhydrides, (2) acidic components (including precursors thereof), (3) metal compounds, (4) stabilizing polymers, and (5) hydrophobic components. By stabilizing bioadhesive polymers against erosion and/or dissolution, prolonged residence time with close proximity to tissue surfaces can be further achieved. The stabilized polymers are also useful to maintain the drug release rate-controlling properties for a prolonged period of time.

The polymers and compositions of the invention often display bioadhesive properties superior to conventional bioadhesives used in therapeutic and diagnostic applications. These bioadhesive polymers and compositions can be used to fabricate new drug delivery or diagnostic systems with increased residence time at tissue surfaces, and consequently increase the bioavailability of a drug or a diagnostic agent. For example, the bioadhesive polymers and compositions of the invention can serve as a coating on a controlled release oral dosage formulation and/or form a matrix in an oral dosage formulation.

DETAILED DESCRIPTION OF THE INVENTION

I. Bioadhesives

Figure 1:
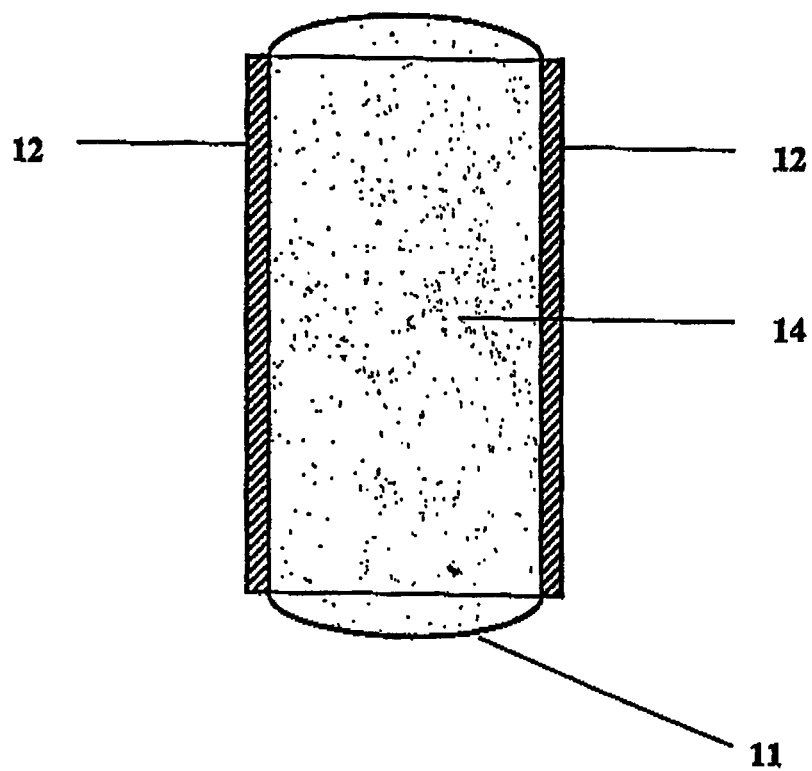
FIG. 1 is a cross-section of a bioadhesive rate-controlling oral dosage formulation (BIOROD).

As generally used herein "bioadhesives" or "bioadhesive materials" refer to the bioadhesive polymers and bioadhesive compositions disclosed herein, including materials that contain one or more additional components in addition to the bioadhesive polymers and bioadhesive compositions of the invention. Bioadhesives also include blends of one or more bioadhesive polymers or blends disclosed herein with one or more other (bioadhesive or non-bioadhesive) polymers or blends. In certain instances, the term "bioadhesive polymers" is used to refer to both compositions where the polymer itself is bioadhesive, as well as compositions where a non- or poorly bioadhesive polymer is combined with a compound that imparts bioadhesive properties to the composition as a whole, as described in detail herein.

As generally used herein "blend" refers to a mixture of two or more polymers or a mixture of one or more polymers with one or more low molecular weight additives containing a catechol functionality. The mixture can be homogeneous or heterogeneous.

As used herein "bioadhesion" generally refers to the ability of a material to adhere to a biological surface for an extended period of time. Bioadhesion requires a contact between the bioadhesive material and the receptor surface, such that the bioadhesive material penetrates into the crevice of the surface (e.g. tissue and/or mucus). Thus the amount of bioadhesive force is affected by both the nature of the bioadhesive material, such as a polymer, and the nature of the surrounding medium. Adhesion of materials to tissues may be achieved by (i) physical or mechanical bonds and/or (ii) secondary chemical bonds (e.g., ionic). Physical or mechanical bonds can result from deposition and inclusion of the adhesive material in the crevices of the mucus or the folds of the mucosa. Secondary chemical bonds, contributing to bioadhesive properties, consist of dispersive interactions (e.g., Van der Waals interactions) and stronger specific interactions, which include hydrogen bonds and ionic bonds. The hydrophilic functional groups responsible for forming hydrogen bonds are the hydroxyl (—OH) and the carboxylic groups (—COOH). Bioadhesive forces are measured in units of N/m², by methods defined in U.S. Pat. No. 6,197,346 to Mathiowitz et al., which is herein incorporated by reference. Bioadhesive forces, especially those exhibited by tablets, can also be measured using a Texture Analyser, such as the TA-TX2 Texture Analyser (Stable Micro Systems, Haslemer, Surrey, UK). As described in Michael J. Tobyn et al, *Eur. J. Pharm. Biopharm.*, 41(4): 235-241 (1995), a mucoadhesive tablet is attached to a probe on the texture analyzer and lowered until it contacts pig gastric tissue, which is attached to a tissue holder and exposed to liquid at 37° C. to simulate gastric medium. A force is applied for a set period of time and then the probe is lifted at a set rate. Area under the force/distance curve calculations are used to determine the work of adhesion. (See also Michael J. Tobyn et al., *Eur. J. Pharm. Biopharm.*, 42(1):56-61 (1996) and David S. Jones, et al., *International J. Pharmaceutics*, 151: 223-233 (1997)).

As used herein "catechol" refers to a compound with a molecular formula of $CO_2H_6O_2$ and the following structure:

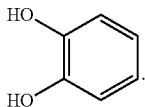

Bioadhesive materials contain a polymer with a catechol functionality or a polymer blended with catechol or a catechol derivative. For materials that contain polymers that have been modified with a catechol functionality, the molecular weight of the bioadhesive materials and percent substitution of the polymer with the aromatic compound may vary greatly. The degree of substitution varies based on the desired adhesive strength, it may be as low as 10%, 20%, 25%, 50%, or up to 100% substitution. On average at least 50% of the monomers in the polymeric backbone are substituted with at least one aromatic group. Preferably, 75-95% of the monomers in the backbone are substituted with at least one aromatic group or a side chain containing an aromatic group. In the preferred embodiment, on average 100% of the monomers in the polymeric backbone are substituted with at least one aromatic group or a side chain containing an aromatic group. The resulting bioadhesive material is a polymer with a molecular weight ranging from about 1 to 2,000 kDa, preferably 1 to 1,000 kDa, more preferably 10 to 1,000 kDa, most preferably 100 to 1,000 kDa, such as 200 to 1,000 kDa or 300 to 800 kDa. For materials in which a polymer has been blended with catechol or a catechol derivative, the ratio of polymer to catechol can be varied in order to vary the bioadhesive properties of the material. The catechol or catechol derivative can be present in an amount from about 0.5% to about 95% by weight of the polymer, typically about 10% to about 75%, preferably about 10% to about 50% and more preferably about 10% to about 30%.

a. Polymers

The polymer that is derivatized or blended with catechol or a catechol derivative may be any non-biodegradable or biodegradable polymer. The polymers can be homopolymers or copolymers. The polymers that are copolymers can be block, alternating or random copolymers. The backbone of the bioadhesive polymer is preferably flexible in order to penetrate mucus and/or epithelial tissue. In the preferred embodiment, the polymer is a hydrophilic polymer. In one embodiment, the polymer is a biodegradable polymer and is used to form an oral dosage formulation.

Examples of biodegradable polymers suitable for use in the invention include synthetic polymers such as poly hydroxy acids, such as polymers of lactic acid and glycolic acid, polyanhydrides, poly(ortho)esters, polyesters, polyurethanes, poly(butyric acid), poly(valeric acid), poly(caprolactone), poly(hydroxybutyrate), poly(lactide-co-glycolide) and poly (lactide-co-caprolactone), and natural polymers such as alginate and other polysaccharides, collagen, chemical derivatives thereof (substitutions, additions of chemical groups, for example, alkyl, alkylene, hydroxylations, oxidations, and other modifications routinely made by those skilled in the art), albumin and other hydrophilic proteins, zein and other prolamines and hydrophobic proteins, copolymers and mixtures thereof. In general, these materials degrade either by enzymatic hydrolysis or exposure to water in vivo, by surface or bulk erosion. The foregoing materials may be used alone, as physical mixtures (blends), or as co-polymers. In one aspect of the invention, a bioadhesive polymer is formed by first coupling a compound to a monomer and then polymerizing the coupled monomer. In this embodiment, the monomers are polymerized to form a polymer, including biodegradable and non-biodegradable polymers. Suitable polymers include, but are not limited to: polyanhydrides, polyamides, polycarbonates, polyalkylenes, polyalkylene oxides such as polyethylene glycol and poloxamers, polyalkylene terepthalates such as poly(ethylene terephthalate), polyvinyl alcohols, polyvinyl ethers, polyvinyl esters, polyethylene, polypropylene, poly(vinyl acetate), poly vinyl chloride, polystyrene, polyvinyl halides, polyvinylpyrrolidone, polyhydroxy acids, polysiloxanes, polyurethanes and copolymers thereof, modified celluloses, alkyl cellulose, hydroxyalkyl celluloses, cellulose ethers, cellulose esters, nitro celluloses, chitosan, chitin, polymers of acrylic and methacrylic esters, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, cellulose sulfate sodium salt, and polyacrylates such as poly(methacrylate) poly(methyl methacrylate), poly(ethylmethacrylate), poly(butylmethacrylate), poly(isobutylmethacrylate), poly(hexylmethacrylate), poly(isodecylmethacrylate), poly (lauryl methacrylate), poly(phenyl methacrylate), poly(methyl acrylate), poly(isopropyl acrylate), poly(isobutyl acrylate) and poly(octadecyl acrylate).

The polymer backbone can be a known bioadhesive polymer that is hydrophilic or hydrophobic. Hydrophilic polymers include CARBOPOL™ (a high molecular weight, crosslinked, acrylic acid-based polymers manufactured by NOVEON™), polycarbophil, pectin, carbomer, cellulose esters, and dextran.

Non-biodegradable polymers, especially hydrophobic polymers, are also suitable for use in the invention. Examples of suitable non-biodegradable polymers include ethylene vinyl acetate, poly(meth)acrylic acid, copolymers of maleic anhydride with other unsaturated polymerizable monomers, poly(butadiene maleic anhydride), polyamides, copolymers and mixtures thereof, and dextran, cellulose and derivatives thereof.

Hydrophobic polymers include polyanhydrides, poly (ortho)esters, and polyesters such as polycaprolactone. Typically, the polymer is sufficiently hydrophobic that it is not readily water soluble, for example the polymer should be soluble up to less than about 1% w/w in water, preferably less than about 0.1% w/w in water at room temperature or body temperature. In a preferred embodiment, the polymer comprises anhydride repeat units, such as a poly(anhydride-coalkene). Particular examples of such polymers are polymers of maleic anhydrides, such as copolymers of maleic anhydride with alkenes (e.g., poly(maleic anhydride-co-butadiene), poly(maleic anhydride-co-styrene). A copolymer can have more than two repeat units, such as poly(butadiene-co-styrene-co-maleic anhydride).

Polyanhydrides can be formed from dicarboxylic acids as described in U.S. Pat. No. 4,757,128 to Domb et al., herein incorporated by reference. Suitable diacids include aliphatic dicarboxylic acids, aromatic dicarboxylic acids, aromatic-aliphatic dicarboxylic acid, combinations of aromatic, aliphatic and aromatic-aliphatic dicarboxylic acids, aromatic and aliphatic heterocyclic dicarboxylic acids, and aromatic and aliphatic heterocyclic dicarboxylic acids in combination with aliphatic dicarboxylic acids, aromatic-aliphatic dicarboxylic acids, and aromatic dicarboxylic acids of more than one phenyl group. Suitable monomers include sebacic acid (SA), fumaric acid (FA), bis(p-carboxyphenoxy)propane (CPP), isophthalic acid (IPh), and dodecanedioic acid (DD).

A wide range of molecular weights are suitable for the polymer backbone of the bioadhesive composition or for the polymer used in the bioadhesive composition. The molecular weight may be as low as about 200 Da (for oligomers) up to about 2,000 kDa. Preferably the polymer (backbone) has a molecular weight of at least 1,000 Da, more preferably at least 2,000 Da, most preferably the polymer has a molecular weight of up to 20 kDa or up to 200 kDa or greater (e.g., 20 kDa to 1,000 kDa, 20 kDa to 200 kDa). The molecular weight of the polymer may be up to 2,000 kDa. For polymers that are blended with catechol or a catechol derivative, the molecular weight is in the range of 20,000 to 1,000,000 Daltons, preferably 20,000 to 200,000 Daltons.

Polymers that are copolymers can be block, alternating or random copolymers, such as the maleic anhydride copolymer disclosed above.

Polymers can be crosslinked or uncrosslinked.

The backbone of bioadhesive polymers is advantageously sufficiently flexible to interpenetrate mucus and/or epithelial tissue, preferably both.

The range of substitution on the polymer backbone of a bioadhesive polymer varies greatly and depends on the polymer used and the desired bioadhesive strength. For example, a butadiene maleic anhydride copolymer that is 100% substituted with D-DOPA will have the same number of D-DOPA molecules per chain length as a 67% substituted ethylene maleic anhydride copolymer. Typically, the polymer backbone has a percent substitution ranging from 1% to 100%, preferably greater than 5%, such as ranging from 5% to 75%.

The polymers that form the backbone of a bioadhesive polymer contain reactive functional groups that interact with the primary amino moiety of the compound.

Polymers used in blends preferably have functional groups that are not reactive with the compounds included in the compositions. The lack of reactivity can be absolute or can be lack of reactivity under the conditions to which the composition is exposed.

b. Reactive Functional Groups

It is important that the polymer or monomer that forms the polymeric backbone of a bioadhesive polymer contains accessible functional groups that easily react with the primary amino moieties contained in the compounds. Suitable reactive functional groups include aldehydes, ketones, carboxylic acid derivatives, anhydrides (e.g., cyclic anhydrides), alkyl halides, acyl azides, isocyanates, isothiocyanates, and succinimidyl esters.

A polymer used in a blend (physical mixture) of the invention need not, and preferably does not, contain functional groups to react with a primary amino moiety.

c. Sidechain Residue Compounds

Although this section is entitled "Sidechain Residue Compounds", implying the compounds are covalently attached to a polymer backbone, the compounds described herein are suitable both for attachment to a polymer backbone and for use in a blend (physical mixture), where no covalent bond exists between the polymer and the residue.

Aromatic groups containing one or more hydroxyl groups are attached to the polymeric backbone. The aromatic groups can be part of a compound that is grafted to the polymer backbone or the aromatic groups may be part of larger sidechains that are grafted to the polymer backbone. In one embodiment, the aromatic group containing one or more hydroxyl groups is catechol or a derivative thereof. Optionally the aromatic compound is a polyhydroxy aromatic compound, such as a trihydroxy aromatic compound (e.g. phloroglucinol and benserazide) or a multihydroxy aromatic compound (e.g. tannin). The aromatic moiety can also be an aromatic moiety that includes two or more (e.g., three or more) hydroxyl substituents, methoxy substituents, substituents hydrolyzable to hydroxyl substituents, or a combination thereof, more typically, hydroxyl substituents or substituents hydrolyzable to hydroxyl substituents. A substituent hydrolyzable to a hydroxyl substituent is a substituent, which when cleaved by water (optionally mediated by an enzyme), that leaves a hydroxyl substituent attached to the phenyl ring. Common examples of such substituents include esters (—O—C(O)—R), carbamates (—O—C(O)—NRR') and carbonates (—O—C(O)—OR).

The catechol derivative also generally contains a reactive group, such as an amino, thiol, or halide group. Suitable sidechains which can be grafted to the polymer backbone include poly(amino acids), peptides, or proteins, having a molecular weight of 20 kDa or less, where at least 10% of the amino acids contain catechol residues; preferably, greater than 50%, more preferably 75%, and most preferably 100% of the amino acids contain catechol residues. Common amino acids with catechol-like residues are phenylanine, tyrosine and tryptophan. Additionally, synthetic amino acids that contain catechol residues may be prepared.

An exemplary catechol derivative is 3,4-dihydroxyphenylalanine (DOPA), which contains a primary amine. L-DOPA is known to be pharmaceutically active and is used as a treatment for Parkinson's disease. Tyrosine, the immediate precursor of DOPA, which differs only by the absence of one hydroxyl group in the aromatic ring, can also be used. Tyrosine is capable of conversion (e.g. by hydroxylation) to the DOPA form.

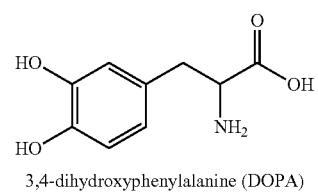 [SMILES: NC(Cc1ccc(O)c(O)c1)C(=O)O]

3,4-dihydroxyphenylalanine (DOPA)

In certain embodiments, the aromatic group is an amine-containing aromatic compound, such as an amine-containing catechol derivative.

Certain of the sidechain residue compounds include a) an aromatic moiety comprising two or more hydroxyl substituents, methoxy substituents, substituents hydrolyzable to hydroxyl substituents, or a combination thereof, and b) a primary or secondary amino moiety.

A subgroup of these compounds is selected such that the cumulative amount of the compound converted to dopamine (i.e., when the compound is not functionalized on (attached to) a polymer backbone) when infused into rat striatum is at least 65% less than for an equimolar amount of L-3,4-dihydroxyphenylalanine. In certain embodiments, the compounds used to form residues are selected such that the cumulative amount of the compound converted to dopamine when infused into rat striatum is at least 70%, 75%, 80%, 85%, 90%, 95% or 100% (i.e., the compound is not converted to dopamine) less than an equimolar amount of L-3,4-dihydroxyphenylalanine. The cumulative amount of a compound converted to dopamine when infused into rat striatum can be measured according to the method described in Brannan, et al., Brain Res. 718:165-168 (1996), the contents of which are incorporated herein by reference. Briefly, a microdialysis probe is lowered into the corpus striatum of anesthetized rats. The probe generally has a tip length of 3 mm and is perfused with an artificial cerebrospinal fluid solution. Concentrations of dopamine in the microdialysis samples are monitored at regular intervals by HPLC or another suitable analytical method. Once the dopamine concentration reaches a basal level, a 1 mM solution of a sidechain residue compound is perfused into the striatum via the probe, with continued monitoring of the dopamine concentration.

Separately or in addition to selection of sidechain residue compounds based upon their ability to be converted into dopamine, sidechain residue compounds can be selected such that the blood-brain barrier is substantially impermeable to these compounds when present as free molecules (i.e., not covalently attached to a polymer). Typically, less than 10%, such as less than 5%, 4%, 3%, 2% or 1%, of a substantially impermeable compound is able to cross the blood-brain barrier. A suitable assay for determining permeability of the blood-brain barrier to a compound is described by Gomes and Soeares-da-Silva in Brain Res. 829:143-150 (1999), the contents of which are incorporated herein by reference. Briefly, the assay measures the uptake of a compound by immortalized rat capillary cerebral endothelial cells (RBE 4), which represent the blood-brain barrier. The endothelial cells are seeded in collagen-treated 24-well plastic culture clusters (16 mm internal diameter) at a density of 40,000 cells per well (20,000 cells/cm$^2$). For 24 hours prior to an experiment, the cell medium is free of fetal bovine serum and basic fibroblast growth factor. Uptake experiments are typically performed 6 days after seeding. On the day of the experiment, the growth medium is aspirated and the cells are washed with Hanks' medium at 4° C., followed by incubating the cells in Hanks' medium at 37° C. for 30 minutes. The cells are incubated for 6 minutes with 2 mL of 1 µM substrate (e.g., sidechain residue compound) in Hanks' medium. Uptake is terminated by rapid removal of uptake solution with a vacuum pump connected to a Pasteur pipette, followed by a rapid wash with cold Hanks' medium and the addition of 250 µL of 0.2 mM perchloric acid. The acidified samples are stored under appropriate conditions until the substrate concentration is measured (e.g., via HPLC).

In another embodiment, the sidechain residue compounds include all sidechain residue compounds having the moieties discussed above, except L-DOPA and/or DL-DOPA.

Typically, the aromatic moiety is a monocyclic aromatic moiety that includes two or more hydroxyl substituents, methoxy substituents, substituents hydrolyzable to hydroxyl substituents, or a combination thereof, more typically, hydroxyl substituents or substituents hydrolyzable to hydroxyl substituents. Preferably, the aromatic moiety is a phenyl moiety that includes two or more (e.g., three or more) hydroxyl substituents, methoxy substituents, substituents hydrolyzable to hydroxyl substituents, or a combination thereof, more typically, hydroxyl substituents or substituents hydrolyzable to hydroxyl substituents. An exemplary aromatic moiety is catechol. The aromatic moiety can include other substituents in addition to those indicated, but typically does not include additional substituents.

A substituent hydrolyzable to a hydroxyl substituent is a substituent, which when cleaved by water (optionally mediated by an enzyme), that leaves a hydroxyl substituent attached to the phenyl ring. Common examples of such substituents include esters (—O—C(O)—R) and carbonates (—O—C(O)—OR).

The primary or secondary amino moiety can be directly attached to a carbon atom or can be part of a hydrazinyl moiety (—NH—NHR).

Suitable compounds for forming residues include D-3,4-dihydroxyphenylalanine (D-DOPA), (D-, L- or a mixture thereof) carbidopa and (D-, L-, or a mixture thereof) benserazide, which have the following structures, respectively:

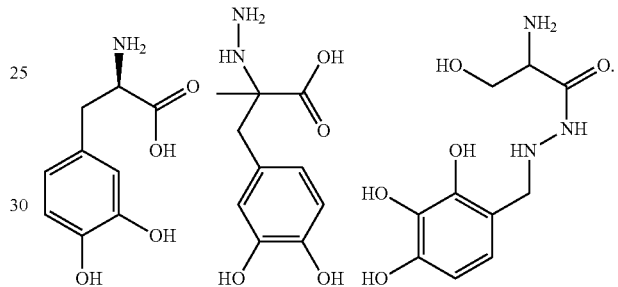

Other suitable compounds for forming residues include 3,4-dimethoxyphenyl-2-hydrazino-2-methyl propanoic acid, 2-aminocarbonyl-amino-3-(3,4-dimethoxyphenyl)-2-methylpropanoic acid, 2-amino-3-(3,4-dimethoxyphenyl)-2-methyl hydrochloride, 2-amino-3-(3,4-dimethoxyphenyl)-2-methyl propane nitrile, methyl-DOPA, 3-O-methylcarbidopa and 4-O-methylcarbidopa, including enantiomers and mixtures thereof.

d. Blends Containing a Catechol or a Catechol Derivative

In one embodiment, the catechol or catechol derivative is blended with a biodegradable or non-biodegradable polymer to form a bioadhesive composition. The polymer is preferably a hydrophobic polymer. Suitable hydrophobic polymers include ethyl cellulose, poly(anhydrides), and polyesters. The preferred catechol derivative is 3,4-dihydroxyphenylalanine (DOPA), which contains a primary amine, or carbidopa. The catechol derivative can be present in an amount from about 0.5% to about 95% by weight of the polymer. For example, blending polycaprolactone with L-DOPA in a ratio of 2:1 w/w results in a bioadhesive material with an adhesive force of 491 mN/cm$^2$ compared to 50 mN/cm$^2$ for polycaprolactone alone.

II. Method of Forming Bioadhesives

Two general methods are used to form the bioadhesive polymers of the invention. In one embodiment, one or more compounds are grafted onto a polymer backbone. Certain compounds used in this method are selected to have
  a) an aromatic moiety comprising two or more hydroxyl substituents, methoxy substituents, substituents hydrolyzable to hydroxyl substituents, or a combination thereof, and
  b) a primary or secondary amino moiety.

In this embodiment, the polymeric backbone is typically a non-biodegradable polymer. In a second embodiment, the compound is coupled to individual monomers and then polymerized.

Chemistry which allows for the conjugation of a polymer or monomer to the compounds described above can be used. For example, the polymer or monomer is functionalized through a nucleophilic addition or a nucleophilic substitution reaction, including a Michael-type addition reaction, between the amino group in the compound and the polymer or monomer. Additionally, other procedures can be used in the coupling reaction. For example, carbodiimide and mixed anhydride based procedures form stable amide bonds between carboxylic acids or phosphates and amino groups, bifunctional aldehydes and bifunctional active esters react with primary amino groups, and divinylsulfone facilitates reactions with amino groups.

a. Polymer Grafting

The compounds are grafted onto the polymer backbone using standard techniques to form the bioadhesive polymer. An example of the grafting procedure is schematically depicted in Reaction 1, which depicts a nucleophilic substitution reaction between a primary amino moiety and a polymer. L-DOPA is grafted to maleic anhydride copolymers by reacting the free amine in L-DOPA with the maleic anhydride bond in the copolymer.

A variety of different polymers can be used as the backbone of the bioadhesive material. Representative polymers include random copolymers (e.g., 1:1 copolymers) of maleic anhydride with ethylene, vinyl acetate, styrene, or butadiene. The variable portions of the backbone structures are designated as the R groups at the bottom of Reaction 1. In addition, a number of other compounds containing aromatic rings with hydroxy substituents, such as tyrosine or derivatives of catechol, can be used in reaction 1.

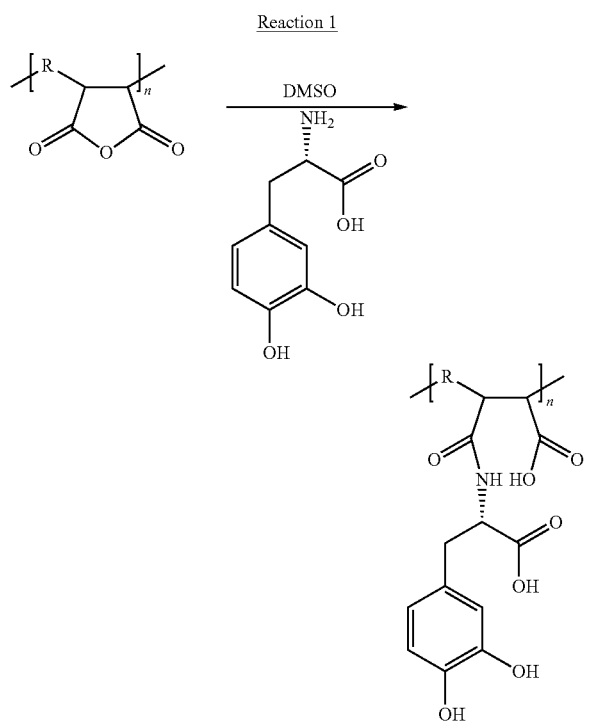

Reaction 1

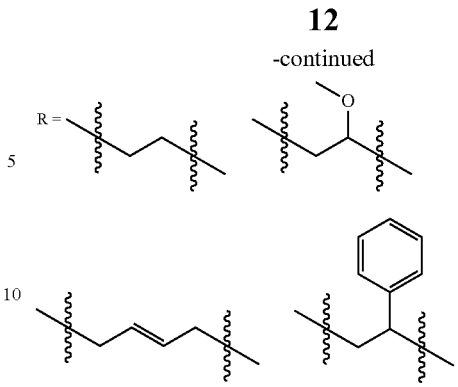

b. Polymer Synthesis

In another embodiment, the polymers are prepared by conjugate addition of one or more compounds containing a primary or secondary amine moiety to one or more monomers containing an amino reactive group. In one example, the monomer is an acrylate or a polymer acrylate. Particular monomers include a diacrylate such as 1,4-butanediol diacrylate; 1,3-propanediol diacrylate; 1,2-ethanediol diacrylate; 1,6-hexanediol diacrylate; 2,5-hexanediol diacrylate; and 1,3-propanediol diacrylate. In the coupling reaction, the monomer and the compound containing an aromatic group are each dissolved in an organic solvent (e.g., tetrahydrofuran (THF), $CH_2Cl_2$, methanol (MeOH), ethanol (EtOH), $CHCl_3$, hexanes, toluene, benzene, $CCl_4$, glyme, diethyl ether, etc.) to form two solutions. The resulting solutions are combined, and the reaction mixture is heated to yield the desired polymer. The molecular weight of the synthesized polymer can be determined by the reaction conditions (e.g., temperature, starting materials, concentration, solvent, etc) used in the synthesis.

In one example, a monomer, such as 1,4-phenylene diacrylate or 1,4 butanediol diacrylate having a concentration of 1.6 M, and D-DOPA or another primary amine containing aromatic molecule are each dissolved in an aprotic solvent such as dimethylformamide (DMF) or dimethylsulfoxide (DMSO) to form two solutions, the solutions are mixed in a 1:1 molar ratio between the diacrylate and the amine group and heated to 56° C. to form a bioadhesive material.

Exemplary polymers prepared by this method include one or more of the following repeat units, including combinations thereof:

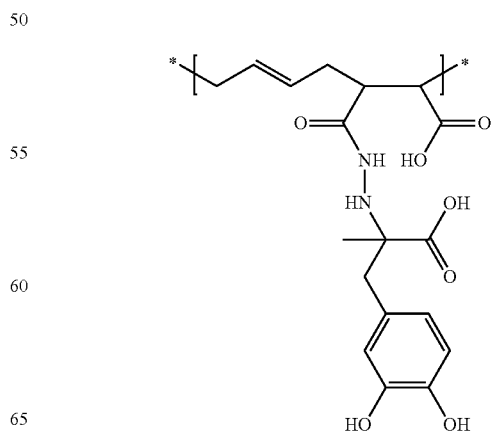

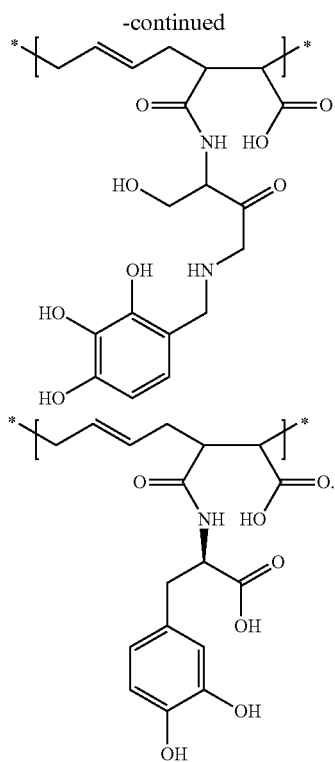

c. Blends

Bioadhesive compositions of the invention also include blends, which include a polymer and one or more of the compounds identified as suitable sidechain residues above. However, unlike the bioadhesive polymers of the invention, there is typically no covalent bond formed between the sidechain residue compound and the polymer in the bioadhesive compositions (i.e., the polymer does not chemically react with the compound, although hydrogen bonds, ionic bonds and/or van der Waals interactions can occur).

In one embodiment, the sidechain residue compound is not carbidopa. In another embodiment, when the sidechain residue compound is carbidopa, the blend comprises an active agent that is not carbidopa or L-DOPA.

Suitable polymers for use in blends are described above. Typically, the polymer itself is not bioadhesive, but the polymer can be bioadhesive (e.g., a polymer with hydrogen bond-forming pendant groups). Preferably, the polymer is a hydrophobic polymer such as a poly(lactone) (e.g., poly(caprolactone), a polyester or a hydrophobic cellulose (e.g., ethyl cellulose)).

To form the blends of the invention, typically a polymer and one or more sidechain residue compounds are dissolved in a compatible solvent and blended together, such as under an adhesive force of at least 10 mN/cm$^2$, at least 25 mN/cm$^2$, at least 50 mN/cm$^2$ or at least 100 mN/cm$^2$ (e.g., 10-500 mN/cm$^2$, 25-100 mN/cm$^2$). The solvent is then evaporated, preferably at a controlled temperature and rate of removal. Alternatively or in combination with general evaporation, the blend can be spray dried or dried at room temperature.

In another example, a mixture of a polymer and one or more sidechain residue compounds are melted at or slightly above the melting point of the polymer, typically while being mixed. Both the polymer and sidechain residue compound should be selected such that they are chemically stable (e.g., do not decompose, do not oxidized) at the melting point temperature. After the composition has re-solidified, it can be milled in order to obtain particles of the desired size.

In certain examples, blends can be prepared by dry mixing of a polymer and one or more sidechain residue compounds, provided that the sidechain residue compound is sufficiently distributed throughout the blend. The sufficiency of distribution can be assessed by measuring the bioadhesiveness of the blend; a blend of the invention having a sufficient distribution of sidechain residue compounds has adhesion of at least 10 N/m$^2$.

Blends of a biodegradable or non-degradable polymer with a catechol or catechol derivative can be prepared by mixing, such as by dissolving the polymer and the catechol or catechol derivative in a suitable solvent and then removing the solvent under controlled conditions of temperature and rate of solvent removal. The resulting blends can be spray dried or dried at room temperature. Alternatively, the blend can be prepared by melt blending the polymer and the catechol or catechol derivative at a temperature corresponding to the melting point of the polymer. For example, polycaprolactone can be melt-blended with L-DOPA (m.p. 295° C.) at a temperature of 58-60° C., which corresponds to the meting point of polycaprolactone. The blends can be also coated onto a substrate using melt extrusion, a fluidized bed, or any method of coating known in the art. The catechol or catechol derivative is present in amount from about 0.5% to about 95% by weight of the polymer.

In each of the above methods, additional components can be added to the mixture prior to dissolution, melting and/or mixing. However, the additional components should be stable under the conditions the mixture is exposed to. In particular, active agents should be stable at the melting point temperature if that method is employed.

The weight ratio of polymer to sidechain residue compound in a blend can be selected to give the desired amount of bioadhesion. Typically, the weight ratio of sidechain residue compound to polymer is 0.5% to 95% by weight, such as 5% to 75% or 25% to 75%.

III. Method for Stabilizing Bioadhesives

The invention includes a bioadhesive material comprising one of the bioadhesive polymers or polymer blends (often referred to collectively hereinbelow as "bioadhesive polymers") described herein and an additive that stabilizes the polymeric component from erosion, dissolution or both, where at least 50% by weight of a 1 mm thick film of the bioadhesive material remains, e.g., after 12 hours in a buffered pH 4.5 dissolution bath.

In certain embodiments, the bioadhesive material film is exposed to the dissolution bath for 6 hours, 8 hours, 10 hours, 12 hours, 14 hours, 16 hours, 18 hours, 20 hours, 24 hours or longer. In certain such embodiments, the amount of bioadhesive material film remaining after exposure to the dissolution bath is at least 50% by weight, at least 60% by weight, at least 70% by weight, at least 80% by weight, at least 90% by weight, at least 95% by weight, at least 97% by weight, at least 98% by weight or even at least 99% by weight of the polymer prior to exposure. A suitable dissolution bath, a USP II apparatus, is described below in the Examples. In certain embodiments, the dissolution bath is stirred at 50 rpm and the temperature is 37° C.

In certain embodiments, the bioadhesive polymers are stabilized against erosion by incorporating one or more additives selected from (1) polyanhydrides, such as those having a molecular weight average in excess of 20,000, (2) acidic components (including precursors thereof), (3) metal compounds, (4) stabilizing polymers, and (5) hydrophobic components.

a. Polyanhydrides

Suitable polyanhydrides for stabilizing the bioadhesive polymers discussed above are described in U.S. Pat. No. 4,757,128 to Domb et al. and U.S. Pat. No. 5,955,096 to Mathiowitz et al., the contents of which are incorporated herein by reference. Polymers may be synthesized from highly pure isolated prepolymers formed from: aliphatic dicarboxylic acids, aromatic dicarboxylic acids, aromatic-aliphatic dicarboxylic acids, combinations of aromatic, aliphatic and aromatic-aliphatic dicarboxylic acids, aromatic and aliphatic heterocyclic dicarboxylic acids and aromatic and aliphatic heterocyclic dicarboxylic acids in combination with aliphatic dicarboxylic acids, aromatic-aliphatic dicarboxylic acids, and aromatic dicarboxylic acids of more than one phenyl group. For example, the following monomers are suitable for synthesizing bioadhesive copolymers: bis(p-carboxyphenoxy)alkanes; hydroquinone-O,O' diacetic acid; 1,4-bis-carboxymethyl benzene; 2,2-bis(4-hydroxphenyl)propane-O,O'-diacetic acid; 2,2-bis(4-carboxyphenyl)propane; terephthalic acid; bis(4-carboxyphenyl)alkanes; 1,4-phenylene dipropionic acid; cyclohexane dicarboxylic acids, adipic acid, sebacic acid (SA), bis(p-carboxyphenoxy)propane (CPP), isophthalic acid (IPh), and dodecanedioic acid (DD). A particular polyanhydride is poly(fumaric acid-co-sebacic acid) (pFA:SA) (e.g., a 20:80 copolymer of p(FA:SA)). Another particular polyanhydride is polyadipic anhydride.

As used herein, the term "anhydride oligomer" refers to a diacid or polydiacid linked by anhydride bonds, and having carboxy end groups linked to a monoacid such as acetic acid by anhydride bonds. The anhydride oligomers have a molecular weight less than about 5000, typically between about 100 and 5000 daltons, or are defined as including between one to about 20 diacid units linked by anhydride bonds. The anhydride oligomer is hydrolytically labile. As analyzed by gel permeation chromatography, the molecular weight may be, for example, on the order of 200-400 for fumaric acid oligomer (FAPP) and 2000-4000 for sebacic acid oligomer (SAPP). In one embodiment, the diacids are those normally found in the Krebs glycolysis cycle. The anhydride oligomer compounds preferably have high chemical reactivity.

Anhydride oligomers can be incorporated into a polyanhydride by combining a finely ground dispersion of particles of oligomer in a solution or dispersion with the polyanhydride. Alternatively, the oligomer compound can be incorporated into the polymer by dispersing the polyanhydride in a solution or dispersion of the oligomer compound and then removing the solvent by evaporation or filtration.

While Applicants do not wish to be bound by theory, it is believed that free carboxylic acid groups of the polyanhydrides form hydrogen bonds with hydroxyl group in the polymers functionalized or blended with catechol and derivatives thereof and/or create a local acidic environment, thereby stabilizing the polymers. It is also believed that the erosion of polyanhydrides is less affected by pH than the polymers functionalized or blended with catechol or a derivative, such that a polyanhydride selected for use herein advantageously erodes at a largely pH-independent rate and/or erodes slowly upon hydration.

Typically, the amount of polyanhydride added to a bioadhesive polymer is from about 0.5% to about 75% by weight, preferably about 5% to about 50% and more preferably about 10% to about 25%.

b. Acidic Components

The bioadhesive polymers can additionally be stabilized by the incorporation of a small molecule (i.e., non-polymeric or oligomeric) acidic component, preferably a slow release acidic component. Typically, the acid is a weak organic acid, for example, an acid having a pKa of about 1 to about 7, such as about 1 to about 5.5, typically about 1.2 to 4.5. Preferably, the acid is poorly soluble in water as defined in the USP, but miscible with the bioadhesive polymer. The acid may contain one or more carboxylic, phosphonic, phosphoric, sulfonic, sulfinic or sulfenic acid moieties, preferably two or more acid moieties. Typically, the acid contains two or more carboxylic acid moieties. Exemplary acids include succinic acid, fumaric acid, citric acid, sebacic acid, adipic acid, lactic acid, malic acid, ascorbic acid, tartaric acid and sorbic acid. In certain embodiments, the acid is not citric acid. In certain such embodiments, the acid is not citric acid, fumaric acid, sebacic acid or lactic acid. In other embodiments, the acid is not a sugar. A combination of two or more such acids may be incorporated into a polymer.

The acid may be an acid precursor, such as an anhydride. An acid precursor is a molecule that is hydrolyzed or metabolized into an acid. Suitable anhydrides includes symmetrical anhydrides (e.g., acetic anhydride, cyclohexanecarboxylic anhydride, hexanoic anhydride, chloroacetic anhydride, thiobenzoic anhydride, thiopropionic anhydride, 2-chloroethanesafinic anhydride, benzenesulfonic anhydride and cyclic anhydrides formed from two acid groups attached to the same molecule such as succinic anhydride, cyclohexane-1,2,3,4-tetracarboxylic acid 3,4-anhydride and phthalic anhydride), unsymmetrical (mixed) anhydrides (e.g., acetic propionic anhydride, benzoic thioacetic anhydride, acetic chloroacetic anhydride, benzenesulfinic ethanesulfonic anhydride, chloroacetic-4-nitrobenzenesulfonic anhydride) and chalcogen analogues of anhydrides (e.g., benzoic thioanhydride, 4-chlorocyclohexane-1-carbothioic thioanhydride, acetic propionic thioanhydride, acetic thiopropionic anhydride, propionic thioacetic anhydride, acetic thiopropionic thioanhydride, propionic thioacetic thioanhydride, thioacetic thiopropionic anhydride). Preferably, the anhydride is succinic anhydride, phthalic anhydride, maleic anhydride, adipic anhydride, butyric anhydride, isobutyric anhydride, propionic anhydride or another carboxylic acid anhydride. More preferably, the anhydride is succinic anhydride.

The acids advantageously are present in a bioadhesive polymer for an extended period of time (e.g., not washed away in an aqueous environment), which is typically achieved either by virtue of low water solubility or by virtue of coating the acids with an appropriate coating. Such acids are collectively referred to herein as slow-release acid components. Acids selected on the basis of solubility typically have a solubility in water of less than 10 mg/mL at pH 4.5 and below. Coatings for an acid are selected such that they do not appreciably dissolve at pH 4.5 or below or such that they coat the acid until the formulation (i.e., polymer) into which the coated acid is incorporated has passed through the stomach (e.g., an enteric coating).

Typically, the amount of an acidic component (including acid precursors) added to a bioadhesive polymer is from about 0.5% to about 75% by weight, such as about 1% to about 65%, preferably about 5% to about 50% (about 5% to about 45%, about 10% to about 30%) and more preferably about 10% to about 25%.

c. Metal Compounds

The bioadhesive polymers described above can also be stabilized by the incorporation of a metal compound, as described in U.S. Pat. No. 5,985,312 to Jacob et al.

The metal compounds preferably are water-insoluble metal compounds, such as water-insoluble metal oxides and hydroxides, including oxides of calcium, iron, copper and zinc. The metal compounds can be combined with a wide range of hydrophilic and hydrophobic polymers including proteins, polysaccharides and synthetic biocompatible polymers.

Metal compounds which can be incorporated into polymers preferably are water-insoluble metal compounds, such as water-insoluble metal oxides and metal hydroxides, which are capable of becoming combined with a polymer to thereby improve the bioadhesiveness of the polymer. As defined herein, a water-insoluble metal compound is defined as a metal compound with little or no solubility in water, for example, less than about 0.0 to 0.9 mg/ml.

The water-insoluble metal compounds can be derived from a wide variety of metals, including, but not limited to, calcium, iron, copper, zinc, cadmium, zirconium and titanium. The water insoluble metal compound preferably is a metal oxide or hydroxide. Water insoluble metal compounds of multivalent metals are preferred. Representative metal oxides suitable for use in the compositions described herein include cobalt oxide (I) (CoO), cobalt oxide (II)($Co_2O_3$), selenium oxide ($SeO_2$), chromium double oxide ($CrO_2$), manganese oxide ($MnO_2$), titanium oxide ($TiO_2$), lanthanum oxide ($La_2O_3$), zirconium oxide ($ZrO_2$), silicon oxide ($SiO_2$), scandium oxide ($Sc_2O_3$), beryllium oxide (BeO), tantalum oxide ($Ta_2O_5$), cerium oxide ($CeO_2$), neodymium oxide ($Nd_2O_3$), vanadium oxide ($V_2O_5$), molybdenum oxide ($Mo_2O_3$), tungsten oxide (WO), tungsten trioxide ($WO_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), lutetium oxide ($Lu_2O_3$), aluminum oxide ($Al_2O_3$), indium oxide ($InO_3$), germanium oxide ($GeO_2$), antimony oxide ($Sb_2O_3$), tellurium oxide ($TeO_2$), nickel oxide (NiO), and zinc oxide (ZnO). Other oxides include barium oxide (BaO), calcium oxide (CaO), nickel oxide (III) ($Ni_2O_3$), magnesium oxide (MgO), iron oxide (II) (FeO), iron oxide (III) ($Fe_2O_3$), copper oxide (II) (CuO), cadmium oxide (CdO), and zirconium oxide ($ZrO_2$). In certain embodiments, the metal compound is ferric oxide, copper oxide or zinc oxide or a combination thereof. In other embodiments, the metal compound is a zirconate, such as magnesium zirconate or calcium zirconate. In yet other embodiments, the metal compound is a silicate, such as magnesium silicate (e.g., a hydrated magnesium silicate such as talc) or calcium silicate. Advantageously, metal compounds which are incorporated into polymers are metal compounds which are already approved by the FDA or an equivalent agency as either food or pharmaceutical additives, such as zinc oxide or talc.

The water-insoluble metal compounds can be incorporated into a polymer by, for example, one of the following mechanisms: (a) physical mixtures which result in entrapment of the metal compound; (b) ionic interaction between metal compound and polymer, (c) surface modification of the polymers which would result in exposed metal compound on the surface; and (d) coating techniques such as fluidized bed, pan coating, or any similar methods known to those skilled in the art, which produce a metal compound enriched layer on the surface of the device. In one embodiment, nanoparticles or microparticles of the water-insoluble metal compound are incorporated into the polymer, preferably as a uniform dispersion.

Fine metal oxide particles can be produced, for example, by micronizing a metal oxide by mortar and pestle treatment to produce particles ranging in size, for example, from 10.0 to 300 nm. The metal oxide particles can be incorporated into a polymer, for example, by dissolving or dispersing the particles into a solution or dispersion of the polymer.

Metal compounds are optionally coated with a protective coating, such as an enteric coating or a rate controlling coating. Such coatings are selected in order to release the metal compound only when the system is exposed to gastric fluid or another targeted environment.

Typically, the amount of a metal compound added to a bioadhesive polymer is from about 1% to about 65% by weight, preferably about 5% to about 45% and more preferably about 10% to about 30%.

c. Stabilizing Polymers

The bioadhesive polymers described above can also be stabilized by the incorporation of certain polymers, particularly a hydrophilic polymer (hydrogel) that forms a rigid gel at pH 4.5 and higher or a hydrophobic polymer. Preferably, a hydrogel has little or no swelling at pH 4.5 or less. One group of suitable polymers includes polymers with pendant hydroxyl, carboxylic acid, amine, amide and/or urea moieties (or, more generally, hydrogen bond donors and/or acceptors). Specific examples of stabilizing polymers include polyvinyl alcohol, polyacrylamide, polyacrylonitrile, polymethacrylic acid, polyacrylic acid (e.g., Carbomer), alginate (e.g., sodium alginate), chitin, chitosan, zein and shellac. Typically, the hydrogel is Carbomer or an alginate. In certain embodiments, the stabilizing polymer is not an alginate. In certain embodiments, the stabilizing polymer is not ethyl cellulose, cellulose acetate and/or zein.

Stabilizing polymers can be combined with a bioadhesive polymer by combining a finely ground dispersion of particles in a solution or dispersion with the bioadhesive polymer. Alternatively, the stabilizing polymer can be combined with the bioadhesive polymer by dispersing the bioadhesive polymer in a solution or dispersion of the hydrogel and then removing the solvent by evaporation or filtration.

Typically, the amount of a stabilizing polymer added to a bioadhesive polymer is from about 1% to about 90% by weight, preferably about 5% to about 70% and more preferably about 10% to about 50%.

d. Hydrophobic Components

The bioadhesive polymers described above can also be stabilized by combination with one or more hydrophobic components. Examples of hydrophobic small molecules include waxy materials (e.g., carnauba wax, beeswax, Chinese wax, spermaceti, lanolin, bayberry wax, Candelilla wax, castor wax, esparto wax, Japan wax, jojoba oil, ouricury wax, rice bran wax, ceresin waxes, montan wax, ozocerite, peat waxes, paraffin wax, polyethylene waxes) and polyglycerol fatty acid esters.

Typically, the amount of a hydrophobic component added to a bioadhesive polymer is from about 1% to about 25% by weight, preferably about 2% to about 10%.

e. Combinations of Additives

The stability of bioadhesive polymers can also be enhanced by incorporating materials from two or more of the classes of materials described above. Thus, the invention includes combinations including: (1) a polyanhydride and an acidic component, (2) a polyanhydride and a metal compound, (3) a polyanhydride and a stabilizing polymer, (4) a polyanhydride and a hydrophobic component, (5) an acidic component and a metal compound, (6) an acidic component and a stabilizing polymer, (7) an acidic component and a hydrophobic component, (8) a metal compound and a stabilizing polymer, (9) a metal compound and a hydrophobic component, (10) a stabilizing polymer and a hydrophobic component, (11) a polyanhydride and an acidic component and a metal compound, (12) a polyanhydride and an acidic component and a stabilizing polymer, (13) a polyanhydride and an acidic component and a hydrophobic component, (14) a polyanhydride and a metal compound and a stabilizing polymer, (15) a polyanhydride and a metal compound and a hydrophobic component, (16) a polyanhydride and a stabilizing polymer and a hydrophobic component, (17) an acidic component and a metal compound and a stabilizing polymer, (18) an acidic component and a metal compound and a hydrophobic component, (19) an acidic component and a stabilizing polymer and a hydrophobic component, (20) a metal compound and a stabilizing polymer and a hydrophobic component, (21) a polyanhydride and an acidic component and a metal compound and a stabilizing polymer, (22) a polyanhydride and an acidic component and a metal compound and a hydrophobic component, (23) a polyanhydride and a metal compound and a stabilizing polymer and a hydrophobic component, (24) an acidic component and a metal compound and a stabilizing polymer and a hydrophobic component and (25) at least one material from each of the five categories. In a one embodiment, a combination of an acidic component and a hydrophobic component are incorporated into a bioadhesive polymer, particularly citric acid and ethylcellulose.

The proportion of additives, when there is a combination of additives, typically falls within the ranges for the individual classes of additives disclosed above.

IV. Applications for Bioadhesives

Bioadhesive materials described herein may be used in a wide variety of drug delivery, tissue engineering and other medical and diagnostic applications. Bioadhesive materials may be formed into microparticles, such as microspheres or microcapsules, or may be a coating on such microparticles. The bioadhesive materials may be applied to tissue engineering matrices or medical implants. In the preferred embodiment, the material is applied as a coating to a solid oral dosage formulation, such as a tablet, capsule, drug eluting device or multiparticulates. The coating may be applied by direct compression or by applying a solution containing the material to the tablets or capsules. In one embodiment, the bioadhesive material is in the matrix of a tablet or other drug delivery device. Optionally, the tablet or drug delivery device contains a coating, such as a coating containing the bioadhesive material or another bioadhesive polymer or an enteric coating.

Bioadhesive materials used as coatings preferably do not appreciably swell upon hydration, such that they do not substantially inhibit or block movement (e.g., of ingested food) through the gastrointestinal tract, as compared to the polymers disclosed by Duchene et al. Generally, polymers that do not appreciably swell upon hydration include one or more hydrophobic regions, such as a polymethylene region (e.g., $(CH_2)_n$, where n is 4 or greater). The swelling of a polymer can be assessed by measuring the change in volume when the polymer is exposed to an aqueous solution. Polymers that do not appreciably swell upon hydration expand in volume by 50% or less when fully hydrated. Preferably, such polymers expand in volume by less than 25%, less than 20%, less than 15%, less than 10% or less than 5%. A polymer that does not appreciably swell upon hydration can be mixed with a polymer that does swell (e.g., Carbopol™, poly(acrylic acid), provided that the amount of swelling in the polymer does not substantially interfere with bioadhesiveness.

In one embodiment, the bioadhesive coating consists of two layers, an inner bioadhesive layer that does not substantially swell upon hydration and an outer bioadhesive layer that is readily hydratable and optionally bioerodable, such as one comprised of Carbopol™.

A tablet or a drug eluting device can have one or more coatings in addition to the bioadhesive coating. These coatings and their thickness can, for example, be used to control where in the gastrointestinal tract the bioadhesive coating becomes exposed. In one example, the additional coating prevents the bioadhesive coating from contacting the mouth or esophagus. In another example, the additional coating remains intact until reaching the small intestine.

Examples of coatings include methylmethacrylates, zein, cellulose acetate, cellulose phthalate, HPMC, sugars, enteric polymers, gelatin and shellac. Premature dissolution of a tablet in the mouth can be prevented with hydrophilic polymers such as HPMC or gelatin.

Coatings used in tablets of the invention, typically include a pore former, such that the coating is permeable to the drug.

Tablets, capsules and drug eluting devices of the invention can be coated by a wide variety of methods. Suitable methods include compression coating, coating in a fluidized bed or a pan, hot melt (extrusion) coating and enrobing. Such methods are well known to those skilled in the art.

In one embodiment, the bioadhesive material is used in drug depot or reservoir systems, such as an osmotic drug delivery system. In one aspect of this embodiment, the bioadhesive material is present in a matrix surrounding the drug to be delivered and/or as a coating on the surface of the system. The depot or reservoir systems contain a microporous or macroporous membrane that separates the outside environment from the drug inside the system. The osmotic delivery system contains osmotic agents, which bring water into the system, causing a swellable material, such as a polymeric matrix or separate polymeric layer, to swell. When the material inside the system swells, it pushes the drug against the semi-permeable membrane and out of the system.

The bioadhesive coating adheres to the mucosa in the aqueous environment of the gastrointestinal tract. As a result, the bioavailability of therapeutic agents is enhanced through increased residence time at the target absorption rate. Typically, the solid oral dosage form contains rate controlling agents, such as hydroxypropylmethyl cellulose (HPMC) and microcrystalline cellulose (MCC). Optionally, the drug may be in the form or microparticles or nanoparticles. In one embodiment, a tablet contains a core containing a nanoparticulate drug and enhancers in a central matrix of rate controlling agents, such as hydroxypropylmethyl cellulose (HPMC) and microcrystalline cellulose (MCC). The core is surrounded on its circumference by bioadhesive polymer or composition of the invention. Optionally, the final tablet is coated with an enteric coating, such as Eudragit L100-55, to prevent release of the drug until the tablet has moved to the small intestine.

The bioadhesive materials may be used in or as a coating on prosthetics, such as dental prosthetics. The materials may be used as dental adhesives, or bone cements and glues. The materials are suitable for use in wound healing applications, such as synthetic skins, wound dressings, and skin plasters and films.

In order to alter the physical properties of bioadhesive materials, additional components can be added to a composition. Such components include bioadhesive modifiers, solvents, thermoplastic polymers and plasticizers.

Bioadhesive materials can be mixed with one or more plasticizers or thermoplastic polymers. Such agents typically increase the strength and/or reduce the brittleness of polymeric coatings. Plasticizers can be hydrophobic or hydrophilic. Examples of plasticizers include dibutyl sebacate, polyethylene glycol, triethyl citrate, dibutyl adipate, dibutyl fumarate, diethyl phthalate, ethylene oxide-propylene oxide block copolymers such as Pluronic™ F68 and di(sec-butyl) fumarate. Example of thermoplastic polymers include polyesters, poly(caprolactone), polylactide, poly(lactide-co-glycolide), methyl methacrylate (e.g., EUDRAGIT™), cellulose and derivatives thereof such as ethyl cellulose, cellulose acetate and hydroxypropyl methyl cellulose (HPMC) and large molecular weight polyanhydrides. The plasticizers and/or thermoplastic polymers are mixed with a bioadhesive polymer to achieve the desired properties. Typically, the proportion of plasticizers and thermoplastic polymers, when present, is from 0.5% to 50% by weight.

Bioadhesive modifiers include both natural and synthetic bioadhesive modifiers, which can be swellable or non-swellable and gellable or non-gellable. Swellable modifiers include fluid-imbibing displacement polymers (osmopolymers), such as poly(alkylene oxide), hydrogels (CARBOPOL®), polyacrylamide, crosslinked poly(indene-co-maleic anhydride), poly(acrylic acid), polysaccharides and polyglucan.

Gellable or non-gellable modifiers include karaya gum, guar gum, okra gum, gum arabic, acacia gum, pectina gum, ghatti gum, tragacanth gum, xanthan gum, locust bean gum, psyllium seed gum, tamarind gum, destria gum, casein gum and other gums.

Natural bioadhesive modifiers include cellulose compounds (cellulose, ethylcellulose, methylcellulose, nitrocellulose, propylcellulose, hydroxypropyl cellulose, hydroxyethylcellulose, carboxymethylcellulose and hydroxypropylmethylcellulose, including alkyl and hydroxyalkyl derivatives), karaya gum, prolamines (zein), L-DOPA, benserazide, carbidopa, dopamine, 3-O-methyldopa and other L-DOPA metabolites. In certain embodiments, the natural bioadhesive modifiers exclude L-DOPA and/or its metabolites.

The bioadhesive modifiers can, for example, be blended with the bioadhesive materials of the invention during the preparation of a pharmaceutical composition. For tablets, a bioadhesive modifier is generally blended with a bioadhesive material though dry or wet mixing prior to tablet preparation.

As disclosed in U.S. Pat. Nos. 5,985,312, 6,123,965 and 6,368,586, the contents of which are incorporated herein by reference, bioadhesive polymers and compositions, such as those named above, having a metal compound combined therewith have a further improved ability to adhere to tissue surfaces, such as mucosal membranes. The metal compound combined with the polymer can be, for example, a water-insoluble metal oxide. The combination of metal compounds with a wide range of different polymers, even those that are not normally bioadhesive, improves their ability to adhere to tissue surfaces such as mucosal membranes.

Metal compounds which can be incorporated into polymers to improve their bioadhesive properties preferably are water-insoluble metal compounds, such as water-insoluble metal oxides and metal hydroxides, which are capable of becoming incorporated into and associated with a polymer to thereby improve the bioadhesiveness of the polymer. As defined herein, a water-insoluble metal compound is defined as a metal compound with little or no solubility in water, for example, less than about 0.0 to 0.9 mg/ml.

The water-insoluble metal compounds can be derived from a wide variety of metals, including, but not limited to, calcium, iron, copper, zinc, cadmium, zirconium and titanium. The water insoluble metal compound preferably is a metal oxide or hydroxide. Water insoluble metal compounds of multivalent metals are preferred. Representative metal oxides suitable for use in the compositions described herein include cobalt (I) oxide (CoO), cobalt (II) oxide ($Co_2O_3$), selenium oxide ($SeO_2$), chromium (IV) oxide ($CrO_2$), manganese oxide ($MnO_2$), titanium oxide ($TiO_2$), lanthanum oxide ($La_2O_3$), zirconium oxide ($ZrO_2$), silicon oxide ($SiO_2$), scandium oxide ($Sc_2O_3$), beryllium oxide (BeO), tantalum oxide ($Ta_2O_5$), cerium oxide ($CeO_2$), neodymium oxide ($Nd_2O_3$), vanadium oxide ($V_2O_5$), molybdenum oxide ($Mo_2O_3$), tungsten oxide (WO), tungsten trioxide ($WO_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), lutetium oxide ($Lu_2O_3$), aluminum oxide ($Al_2O_3$), indium oxide ($InO_3$), germanium oxide ($GeO_2$), antimony oxide ($Sb_2O_3$), tellurium oxide ($TeO_2$), nickel oxide (NiO), and zinc oxide (ZnO). Other oxides include barium oxide (BaO), calcium oxide (CaO), nickel oxide (III) ($Ni_2O_3$), magnesium oxide (MgO), iron (II) oxide (FeO), iron (III) oxide ($Fe_2O_3$), copper oxide (II) (CuO), cadmium oxide (CdO), and zirconium oxide ($ZrO_2$).

Preferred properties defining the metal compound include: (a) substantial insolubility in aqueous environments, such as acidic or basic aqueous environments (such as those present in the gastric lumen); and (b) ionizable surface charge at the pH of the aqueous environment.

The water-insoluble metal compounds can be incorporated into the material by one of the following mechanisms: (a) physical mixtures which result in entrapment of the metal compound; (b) ionic interaction between metal compound and polymer, (c) surface modification of the polymers which would result in exposed metal compound on the surface; and (d) coating techniques such as fluidized bed, pan coating, or any similar methods known to those skilled in the art, which produce a metal compound enriched layer on the surface of the device. In one embodiment, nanoparticles or microparticles of the water-insoluble metal compound are incorporated into the polymer.

Advantageously, metal compounds which are incorporated into materials to improve their bioadhesive properties can be metal compounds which are already approved by the FDA as either food or pharmaceutical additives, such as zinc oxide.

Bioadhesive materials with further enhanced bioadhesive properties can be obtained by incorporating anhydride monomers or oligomers into one of the bioadhesive materials disclosed herein by dissolving, dispersing, or blending, as taught by U.S. Pat. Nos. 5,955,096 and 6,156,348, the contents of which are incorporated herein by reference. The anhydride oligomers are formed from organic diacid monomers, preferably the diacids normally found in the Krebs glycolysis cycle. Anhydride oligomers which enhance the bioadhesive properties of a polymer have a molecular weight of about 5000 or less, typically between about 100 and 5000 daltons, or include 20 or fewer diacid units linked by anhydride linkages and terminating in an anhydride linkage with a carboxylic acid monomer.

The oligomer excipients can be blended or incorporated into a wide range of hydrophilic and hydrophobic polymers including proteins, polysaccharides and synthetic biocompatible polymers, including those described above. In one embodiment, anhydride oligomers may be combined with metal oxide particles, such as those described above, to improve bioadhesion even more than with the organic additives alone. Organic dyes, because of their electronic charge and hydrophobicity or hydrophilicity, can either increase or decrease the bioadhesive properties of polymers when incorporated into the polymers.

As used herein, the term "anhydride oligomer" refers to a diacid or polydiacid linked by anhydride bonds, and having carboxy end groups linked to a monoacid such as acetic acid by anhydride bonds. The anhydride oligomers have a molecular weight less than about 5000, typically between about 100 and 5000 daltons, or are defined as including between one to about 20 diacid units linked by anhydride bonds. In one embodiment, the diacids are those normally found in the Krebs glycolysis cycle. The anhydride oligomer compounds have high chemical reactivity.

Control of the rate that an active drug (e.g., a sustained release or controlled delivery form of a drug) is introduced to a targeted delivery site and its residence time at the targeted delivery site (e.g., site of absorption) is achieved, at least in part, by using excipients, such as polymeric excipients. The exact mechanism by which a polymer interacts with the mucosa or controls the delivery of the drug is at least partially dependent on the rate of polymer hydration and swelling, which is related to its molecular weight. Therefore, any process that significantly reduces the molecular weight of the polymer is likely to affect its ability to control the drug delivery. Oxidative degradation can lead to a loss in molecular weight for several polymers commonly used in controlled release applications (Waterman, K. C., et. al., Pharm. Dev. Technol., 2002, 1-32). In addition to a loss in molecular weight, such degradation in polymers can produce reactive impurities and end groups to compromise the chemical stability of drugs and also their effectiveness as a bioadhesive polymer or release controlling agent. An example of class of controlled release polymers that can degrade to compromise the drug release rate is the polyoxyethylenes, including poly (ethylene oxides) (Polyox™), poly(ethylene glycols), and poly(oxyethylene) alkyl ethers. The polyethylene oxide is usually treated by the manufacturer (Dow chemicals) with 100-1000 ppm of butylated hydroxy toluene (BHT) to reduce such degradation. While this antioxidant is quite effective, it is volatile and can be lost during any heating steps and therefore it is advisable to include an additional antioxidants to the formulation matrix to retain the polymer behavior intact (Waterman, K. C., et. al., Pharm. Dev. Technol., 2002, 1-32).

Hence, it is advisable to incorporate some stabilizers, preferably antioxidants or chelating agents, to inhibit any impurity-related degradation of drugs. Antioxidants can reduce formation of peroxides, but may be less effective in eliminating of peroxides already present in a dosage form. Currently, the marketed form of bupropion hydrochloride is stabilized with an antioxidant like L-cysteine hydrochloride. In contrast, chelating agents such as citric acid, edetic acid, fumaric acid and malic acid are recommended for inhibition of any metal induced oxidation. Chelating agents are generally more effective when added during a granulation step or by coating particles using fluid bed technology, rather than simply during physical mixing. Suitable antioxidants and chelating agents are disclosed in U.S. Pat. No. 6,423,351, the contents of which are incorporated herein by reference, which discloses prevention of drug oxidation using a ferrous ion source. Other suitable antioxidants include vitamin E, vitamin C, butylated hydroxytoluene, and butylated hydroxyanisole.

The pH to which a polymer is exposed can play a significant role in the stabilization of the polymer to oxidation. It is in general more difficult to remove an electron from a polymer when it is positively charged. For this reason, stability against oxidation is often greater under low pH conditions, which promote protonation of polymers if protonation is possible. In the converse, higher pH conditions, which deprotonate a polymer, generally make a drug more susceptible to oxidation.

U.S. Pat. Nos. 5,358,970; 5,541,231; 5,731,000 and 5,763,493 to Ruff et al, the contents of which are incorporated herein by reference, describe a stabilized bupropion hydrochloride formulation having a stabilizer selected from group consisting of L-cysteine hydrochloride, glycine hydrochloride, malic acid, sodium metabisulfite, citric acid, tartaric acid, L-cystine dihydrochloride, ascorbic acid, and isoascorbic(erythorbic) acid. Such stabilizers are useful herein as antioxidants and/or chelating agents. U.S. Pat. No. 6,652,882 to Odidi et. al describes stabilization of drug by a saturated polyglycolised glyceride like Gelucire™, and such compounds are suitable for use in the present invention.

Other oxidation stabilization strategies for bupropion formulations, which are suitable for use herein, include the addition of inorganic acids like hydrochloric acid, phosphoric acid, nitric acid and sulfuric acid (U.S. Pat. No. 5,968,553, the contents of which are incorporated herein by reference); dicarboxylic acids like oxalic acid, succinic acid, adipic acid, fumaric acid, benzoic acid and phthalic acid (U.S. Pat. Nos. 6,194,002; 6,221,917; 6,242,496; 6,482,987 and 6,652,882, the contents of which are incorporated herein by reference); sulfites like potassium metabisulfite and sodium bisulfite (U.S. Pat. No. 6,238,697, the contents of which are incorporated herein by reference); organic esters like L-ascorbic acid palmitate, tocopherol solution in alcohol, butylated hydroxy anisole, tocopherol or tocopherol, vitamin E succinate, vitamin E 700 acetate, and L-ascorbic acid G palmitate (U.S. Pat. No. 6,312,716, the contents of which are incorporated herein by reference). The use of acidified granules of microcrystalline cellulose (U.S. Pat. No. 6,153,223, the contents of which are incorporated herein by reference); salts of organic bases like creatinine hydrochloride, pyridoxine hydrochloride and thiamine hydrochloride and inorganic acid like potassium phosphate monobasic (U.S. Pat. No. 6,333,332, the contents of which are incorporated herein by reference) is also suitable for the present invention.

Typically, antioxidants used in the present invention are selected from ascorbyl palmitate, butylated hydroxyanisole, butylated hydroxytoluene, malic acid, propyl gallate, sodium bisulfite, sodium sulfite, sodium metabisulfite, potassium metabisulfite, potassium bisulfite, sodium thiosulfate, sodium formaldehyde sulfoxylate, L-ascorbic acid, D-ascorbic acid, acetylcysteine, cysteine, thioglycerol, thioglycollic acid, thiolactic acid, thiourea, dithiothreitol, dithioerythreitol, glutathione, nordihydroguaiaretic acid, tocopherol, fumaric acid and succinic acid.

The term "acidification" refers to any method of lowering the pH of the bioadhesive polymers either before or after combination with a compatible pharmaceutical drug. Preferably, acidification employs a pharmaceutically acceptable acid to lower pH. Suitable pharmaceutically acceptable acids are well known in the art and include, by way of example only, hydrochloric acid, phosphoric acid, acetic acid, citric acid, fumaric acid, succinic acid, lactic acid, and the like.

Preferably, an antioxidant or a chelating agent is added to a bioadhesive polymer prior to formulating it with a drug. The antioxidant or chelating agent can be added as a dry material or during wet granulation or following the extrusion or annealing process.

Antioxidants (also sometimes referred to as free radical absorbers) self-sacrificially stabilize materials against free radicals (for example, free radicals generated from photooxidation as a result of exposure to sunlight). The antioxidant and the bioadhesive polymer are preferably maintained in sufficiently close proximity such that a synergistic effect on stability of the polymer is achieved. In that regard, a bioadhesive polymer (e.g., a carbidopa-BMA polymer) can be maintained in sufficiently close proximity to the antioxidant moiety to enhance the stability of the carbidopa-based polymer in an environment in which photo-oxidation can occur. Such close proximity is not typically obtained upon mere physical mixing of antioxidant and UV-absorber.

In order to further protect a drug formulation, an antioxidant can be present in combination with a UV-absorber such as PABA or BHT. These components can be localized such that the UV-absorber is within a single molecule (for example, within a single oligomeric or polymer chain). For example, the antioxidant and the UV-absorber can be localized through covalent bonding by reacting (for example, copolymerizing) at least one monomer including or incorporating the antioxidant with at least one monomer including or incorporating the UV-absorber. Antioxidants and UV-absorbers can also be conjugated to a suitably reactive polymer.

Antioxidants, chelating agents and UV-absorbers should be selected such that they do not react with a drug planned to be delivered with the polymer.

Typically, about 0.1% to about 20% by weight, such as about 0.5% to about 10% or about 1% to about 5%, of antioxidant and/or chelating agent is added to a bioadhesive polymer.

a. Materials that can be Incorporated into the Bioadhesive Materials

There is no specific limitation on the material that can be encapsulated within the bioadhesive materials. Any kind of therapeutic, prophylactic or diagnostic agent, including organic compounds, inorganic compounds, proteins, polysaccharides, nucleic acids, or other materials can be incorporated using standard techniques. Flavorants, nutraceuticals, and dietary supplements are among the materials that can be incorporated in the bioadhesive material.

Examples of useful proteins include hormones such as insulin, growth hormones including somatomedins, transforming growth factors and other growth factors, antigens for oral vaccines, enzymes such as lactase or lipases, and digestive aids such as pancreatin.

Examples of useful drugs include ulcer treatments such as Carafate from Marion Pharmaceuticals, antihypertensives or saluretics such as Metolazone from Searle Pharmaceuticals, carbonic anhydrase inhibitors such as Acetazolamide from Lederle Pharmaceuticals, insulin-like drugs such as glyburide, a blood glucose lowering drug of the sulfonylurea class, hormones such as Android F from Brown Pharmaceuticals and Testred (methyltestosterone) from ICN Pharmaceuticals, and antiparasitics such as mebeandazole (VERMOX™, Jannsen Pharmaceutical). Other drugs for application to the vaginal lining or other mucosal membrane lined orifices such as the rectum include spermicides, yeast or trichomonas treatments and anti-hemorrhoidal treatments.

Drugs may be classified using the Biopharmaceutical Classification System (BCS), which separates pharmaceuticals for oral administration into four classes depending on their aqueous solubility and their permeability through the intestinal cell layer. According to the BCS, drug substances are classified as follows:

Class I—High Permeability, High Solubility
Class II—High Permeability, Low Solubility
Class III—Low Permeability, High Solubility
Class IV—Low Permeability, Low Solubility.

The interest in this classification system stems largely from its application in early drug development and then in the management of product change through its life-cycle. In the early stages of drug development, knowledge of the class of a particular drug is an important factor influencing the decision to continue or stop its development. Examples of various BCS Class of drugs can be found in the following two articles: Kasim N A et al., Molecular Pharmaceutics 1:85-96, (2004) and Rinaki E. et al, Pharm. Res. 20(12):1917-1925 (2003), the contents of which are incorporated herein by reference.

Class II drugs are drugs that are particularly insoluble, or slow to dissolve, but that readily are absorbed from solution by the lining of the stomach and/or the intestine. Hence, prolonged exposure to the lining of the GI tract is required to achieve absorption. Such drugs are found in many therapeutic classes.

Many of the known Class II drugs are hydrophobic, and have historically been difficult to administer. Moreover, because of the hydrophobicity, there tends to be a significant variation in absorption depending on whether the patient is fed or fasted at the time of taking the drug. This in turn can affect the peak level of serum concentration, making calculation of dosage and dosing regimens more complex.

Both Class III and IV drugs are often problematic or unsuitable for sustained release or controlled release. Class III and Class IV drugs are characterized by insolubility and poor biomembrane permeability and are commonly delivered parenterally. Traditional approaches to parenteral delivery of poorly soluble drugs include using large volumes of aqueous diluents, solubilizing agents, detergents, non-aqueous solvents, or non-physiological pH solutions. These formulations, however, can increase the systemic toxicity of the drug composition or damage body tissues at the site of administration.

In one embodiment, one or more Class I, II, III, or IV drugs are included in a core of a solid oral dosage formulation, and the core is surrounded on at least its circumference by one or more bioadhesive polymers.

Drugs suitable for use in the invention include caffeine, carbamazepine, fluvastatin, Ketoprofen, Metoprolol, Naproxen, Propranolol, Theophylline, Verapamil, Diltiazem, Gabapentin, Levodopa CR, Divalproex sodium, itraconazole and its relatives, fluoconazole, terconazole, ketoconazole, and saperconazole, griseofulvin and related compounds such as griseoverdin, some anti malaria drugs (e.g. Atovaquone), immune system modulators (e.g. cyclosporine), cardiovascular drugs (e.g. digoxin and spironolactone), ibuprofen, danazol, albendazole, clofazimine, acyclovir, carbamazepine, proteins, peptides, polysaccharides, nucleic acids, nucleic acid oligomers, viruses, Neomycin B, Captopril, Atenolol, Valproic Acid, Stavudine, Salbutamol, Acyclovir, Methotrexate, Lamivudine, Ergometrine, Ciprofloxacin, Amiloride, Caspofungin, Clorothiazide, Tobramycin, Cyclosporin, Allopurinol, Acetazolamide, Doxycyclin, Dapsone, Nalidixic Acid, Sulfamethoxazole, Tacrolimus, And Paclitaxel.

Both Class III and IV drugs are often problematic or unsuitable for sustained release or controlled release. Class III and Class IV drugs are characterized by insolubility and poor biomembrane permeability and are commonly delivered parenterally. Traditional approaches to parenteral delivery of poorly soluble drugs include using large volumes of aqueous diluents, solubilizing agents, detergents, non-aqueous solvents, or non-physiological pH solutions. These formulations, however, can increase the systemic toxicity of the drug composition or damage body tissues at the site of administration.

In one embodiment, one or more Class I, II, III or IV drugs are included in a core of a solid oral dosage formulation, and the core is surrounded on at least its circumference by one or more bioadhesive polymers.

In a preferred method for imaging, a radiopaque material such as barium is coated with a bioadhesive material. Radioactive materials or magnetic materials could be used in place or, or in addition to, the radiopaque materials.

b. Tablets

The bioadhesive polymer may be used as one or more layers in a bioadhesive drug delivery tablet formulation. In the preferred embodiment, the formulation is a rate controlled oral dosage formulation (also referred to herein as "BIOROD") in the form of a tablet. The bioadhesive drug delivery formulation contains a core, a bioadhesive coating, and optionally an enteric or non-enteric coating. The core contains one or more drugs, either alone or with a rate controlling membrane system. The core is enveloped on its circumference by a bioadhesive coating. FIGS. 1-9 illustrate a bioadhesive rate controlled oral dosage formulation (11), which contains at least a bioadhesive polymer (12) and a core (14).

The overall shape of the device has been designed to be compatible with swallowing. As shown in FIG. 1, the core (14) is longitudinally compressed to form a capsule-shaped tablet, which is surrounded on its circumference by a bioadhesive polymeric cylinder (12).

Figure 2:
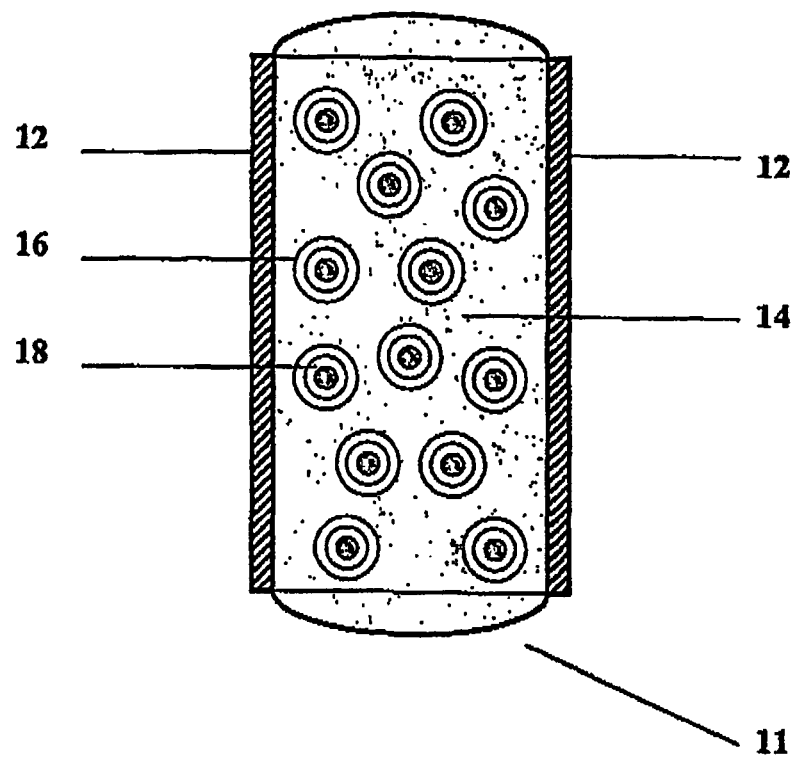
FIG. 2 is a cross-section of a BIOROD containing multiparticulates.
Figure 3:
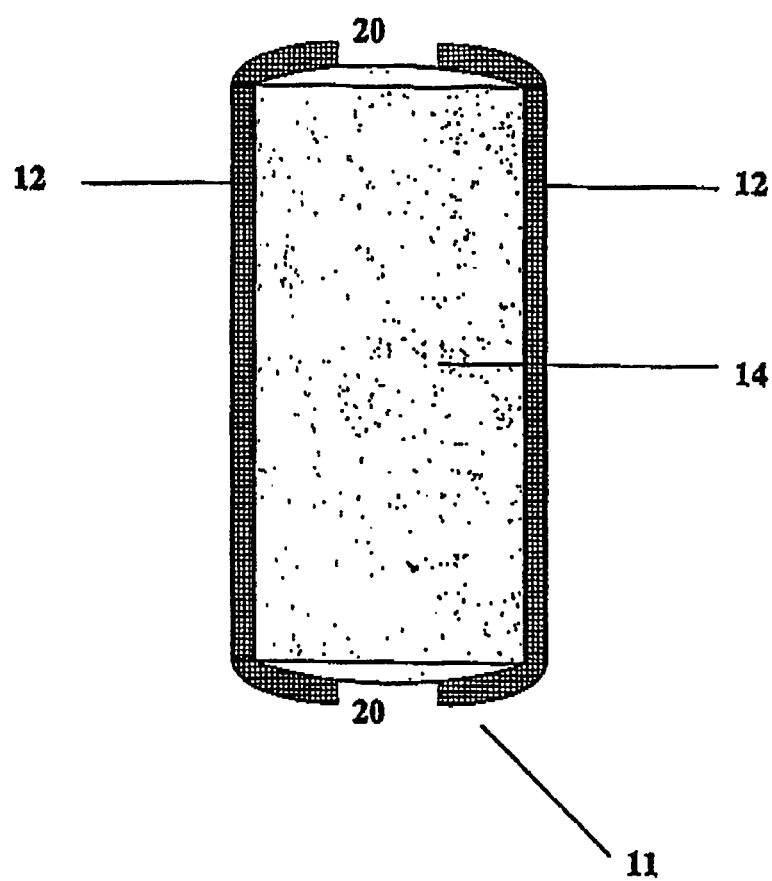
FIG. 3 is a cross-section of a BIOROD with restricted release openings.

In one embodiment shown in FIG. 2, the active agent is in the form of microparticles (16), optionally the microparticles are coated with rate controlling polymers (18). In another embodiment shown in FIG. 3, the core (14) is encapsulated in a bioadhesive polymeric cylinder (12), where the cylinder contains restricted release openings at the top and bottom of the cylinder (20).

Figure 4:
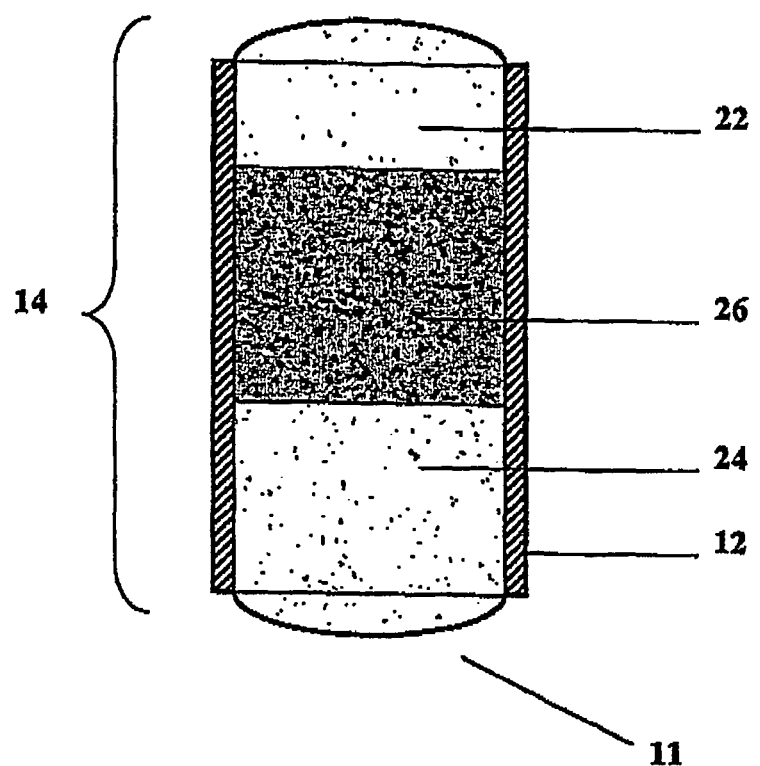
FIG. 4 is a cross-section of a BIOROD with multiple drug layers and restricted release openings.

In yet another embodiment shown in FIG. 4, the core contains multiple drug layers (22 and 24). Optionally, one or more of the drug layers is a controlled release layer, one or more of the layers are immediate release layers, or one of the layers is a controlled release layer while the other layer is an immediate release layer. The tablet also contains a third drug layer (26) or a separating layer (26). Optionally, the capsule also contains restricted release openings (not shown in figure).

In another embodiment, the capsule is an osmotic drug delivery system. The entire device is coated with a semipermeable membrane, in the preferred embodiment, the membrane is a rigid semipermeable membrane.

Figure 5:
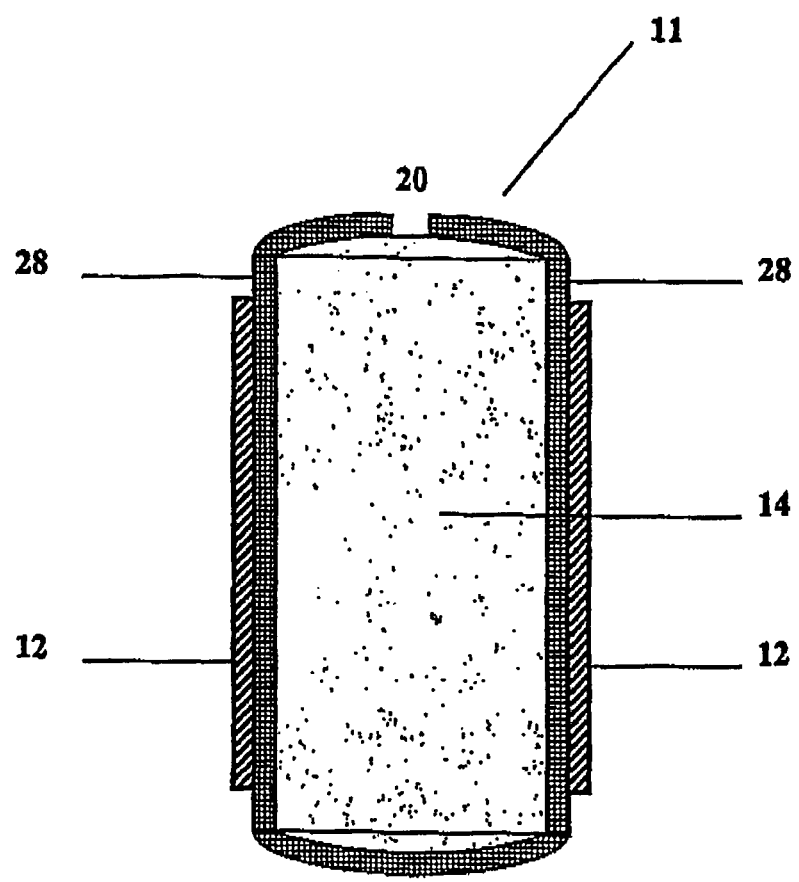
FIG. 5 is a cross-section of an osmotic BIOROD system.
Figure 6:
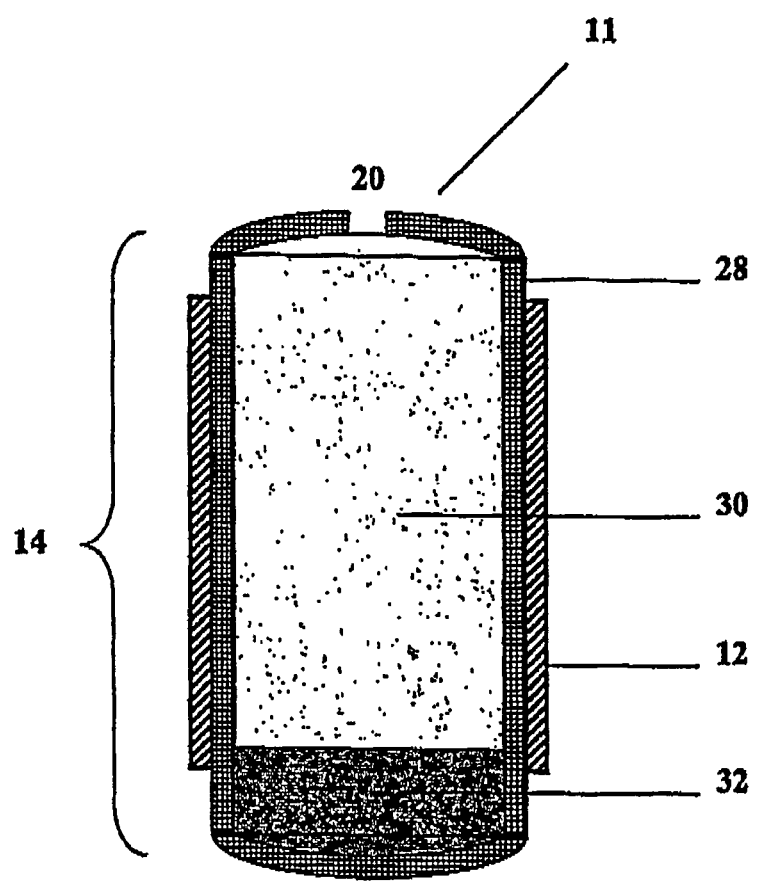
FIG. 6 is a cross-section of a push-pull osmotic BIOROD system.
Figure 7:
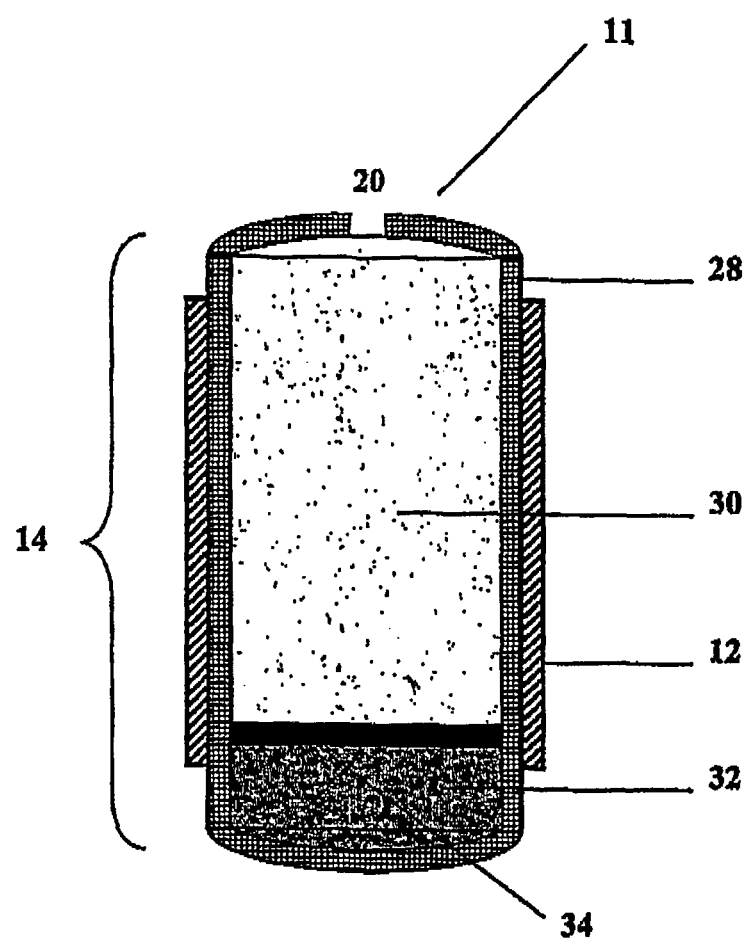
FIG. 7 is a cross-section of a push-pull osmotic BIOROD system with an insoluble plug between the drug layer and the polymer layer.
Figure 8:
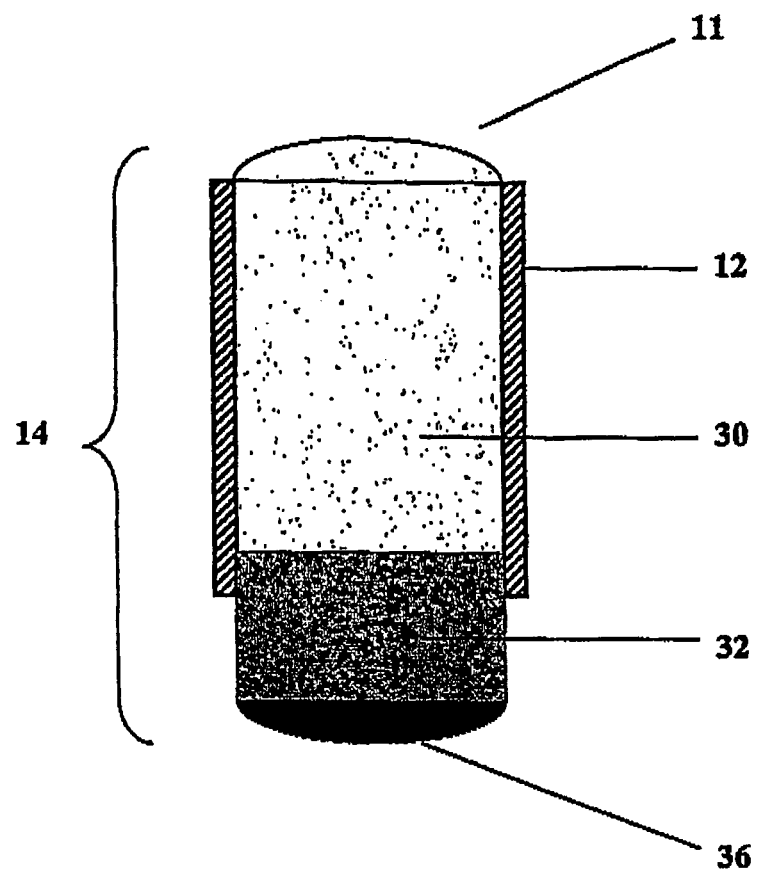
FIG. 8 is a cross-section of a push-pull osmotic BIOROD system with an insoluble plug beneath the polymer layer.

As shown in FIG. 5, an osmotic BIOROD system contains a core (14), a semi-permeable coating (28) and a bioadhesive polymer cylinder (12). The semipermeable membrane is located between the core and the bioadhesive layer. The core contains one or more drugs and osmotic agents which pull water across the semi-permeable membrane. Optionally, the capsule contains one or two restricted release openings (20) at the top and/or bottom of the bioadhesive cylinder. In the preferred embodiment, the osmotic delivery system is a "push-pull" system. Examples of this system are illustrated in FIGS. 6-8. The upper chamber contains the drug and is connected to the outside environment via a small exit hole. The lower chamber contains a swellable polymer and an osmotic attractant and may have no exit hole. Suitable osmotic agents include sugars and glycols. Once the tablet has been swallowed, water is drawn into both the upper and lower chambers. Because the lower chamber has no exit hole it expands, pushing the drug layer into the upper chamber, optionally by pushing a plug or diaphragm layer which is located between the drug layer and the push layer. Thus, the drug in the upper chamber is pushed out from the exit hole. As illustrated in FIG. 6, the core contains one layer with an active agent (30), and a second layer with a swellable polymer and osmotic agents (32). The polymer layer (32) is a "push layer" since it pushes drug out of the device when it swells at controlled rates. The system may contain at least one opening (20), as shown in FIG. 6. Optionally, the active agent (30) is separated from the push layer (32) by an insoluble plug (34) (see FIG. 7). In yet another embodiment illustrated in FIG. 8, the push-pull osmotic delivery system contains an active agent (30) in the drug layer and a swellable polymer and osmotic attractant (32) in the push layer. The drug layer (30) is surrounded on its circumference by a bioadhesive cylinder (12). The lower end of the push layer (32) is adjacent to an insoluble plug (36).

Figure 9:
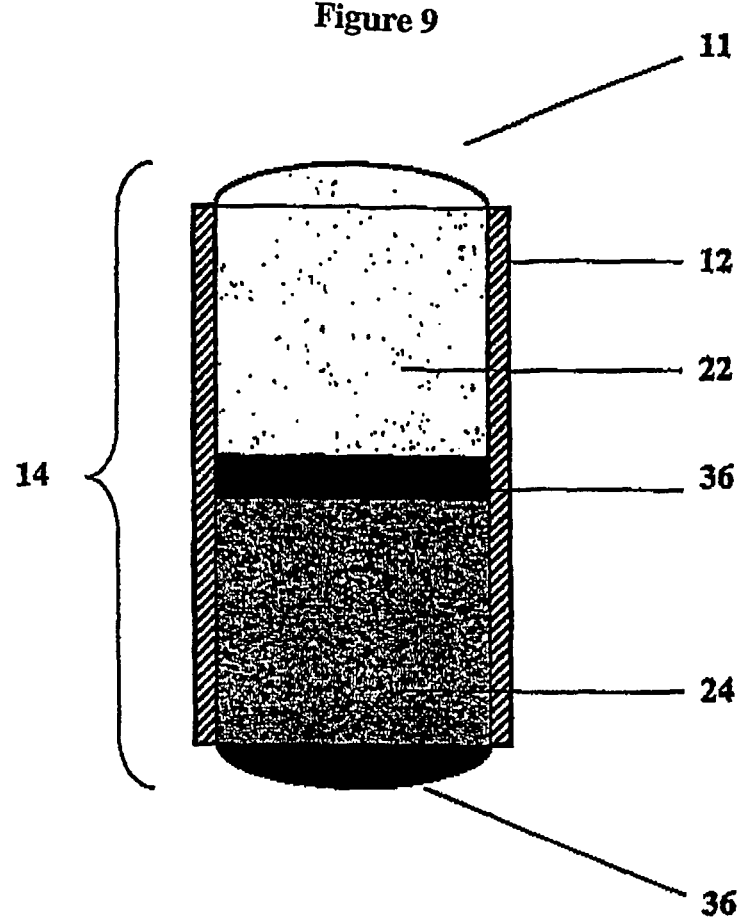
FIG. 9 is a cross-section of a two-pulse BIOROD system.

A two-pulse BIOROD system contains either the same drug in controlled release and immediate release layers in a capsule or two different drugs in either controlled release or immediate release layers in the same capsule. One embodiment of a two-pulse BIOROD system is illustrated in FIG. 9, the BIOROD system contains a plug below and above (36) the lower drug layer (24), while the upper drug layer does not contain a plug above the upper drug layer (22). This allows the drug in the upper layer (22) to be released prior to the release of the drug in the lower layer (24).

Figure 10:
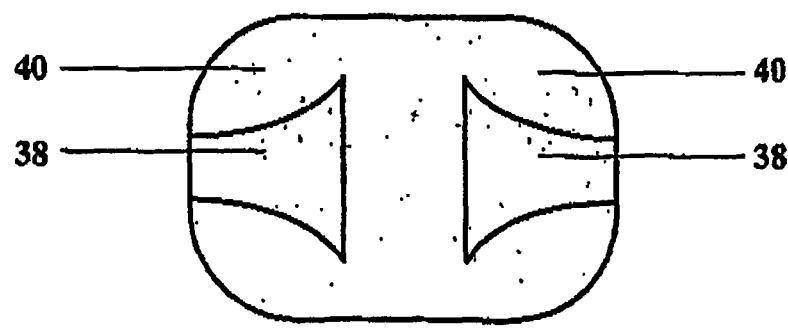
FIG. 10 is a cross-section of a tablet containing precompressed inserts of an active agent.

In yet another embodiment of the oral dosage formulation, the tablet contains precompressed inserts of an active agent, optionally with excipients, (38) and permeation enhancers, optionally with excipients, embedded in a matrix of bioadhesive polymer (40) (see FIG. 10). Drug is released only at the edge of the tablet and the kinetics of drug release is controlled by geometry of the inserts (38). Zero and first order release profiles are achievable with this tablet design and it is possible to have different release rates for permeation enhancer and drug by changing the configuration of the inserts.

i. Methods of Making Bioadhesive Rate Controlling Oral Dosages

The extruded bioadhesive polymer cylinder is formed of one or more bioadhesive polymers. One of the bioadhesive polymers is a biodegradable or non-biodegradable polymer backbone where all or a portion of the monomers that form the polymer are substituted with a compound that includes an aromatic moiety with two or more hydroxyl substituents, methoxy substituents, substituents hydrolyzable to hydroxyl substituents, or a combination thereof, and a primary amino moiety. Other bioadhesive polymers include poly(fumaric acid-co-sebacic acid) (pFA:SA), as described in U.S. Pat. No. 5,955,096 to Mathiowitz et al. (e.g. a 20:80 copolymer of p(FA:SA)), oligomers and metal oxides, as described in U.S. Pat. No. 5,985,312 to Jacob et al., and other commercially available bioadhesive polymers, such as Gantrez (Polymethyl vinyl ether/maleic anhydride copolymers), CARBOPOL® (Noveon) (high molecular weight homo- and copolymers of acrylic acid crosslinked with a polyalkenyl polyether). Optionally the bioadhesive layer contains one or more plasticizers, pore-forming agents, and/or solvents. Suitable plasticizers include dibutyl sebacate, dibutyl adipate, dibutyl fumarate, polyethylene glycol, triethyl citrate, and PLURONIC® F68 (BASF). Suitable pore forming agents include sugars and salts, such as sucrose, lactose, dextrose, mannitol, polyethylene glycol, sodium chloride, calcium chloride, phosphate buffer, tris buffer, and citric acid. Thermoplastic polymers can be added to the bioadhesive layer to modify the moldability and mechanical strength of the bioadhesive polymer cylinder. Suitable thermoplastic polymers include polyesters, such as poly(lactic acid-co-glycolic acid) (PLGA), poly(lactic acid) (PLA), poly(caprolactone) (PCL); methylmethacrylates, such as Eudragit RL100, Eudragit RS100, and Eudragit NE 30D; and modified celluloses, such as hydroxypropylmethylcellulose (HPMC), hydroxypropylcellulose (HPC), cellulose acetate, and ethyl cellulose. The bioadhesive layer may also include or be coated with one or more anti-adherent or anti-tacky (anti-tacking) agents, such as talc, titanium dioxide, fumed silica, colloidal silicon dioxide, glyceryl monostearate, polymeric electrolytes, condensed silicates, polyphosphates, xylin derivatives, aluminum stearate, aluminum laurate, calcium stearate, zinc stearate, kaolin, cornstarch, DL-Leucine, sodium lauryl sulfate, and magnesium stearate.

1. Method for Production of the Hollow Bioadhesive Cylinder

In the preferred embodiment, the extruded polymer cylinder is prepared via hot-melt extrusion process, where the desired bioadhesive polymer is fed into the extruder as a pellet, flake, or powder, optionally along with one or more plasticizers. The materials are blended as they are propelled continuously along a screw through regions of high temperature and pressure to form the polymer extrudate. The extrudate is pushed from the extruder through a die having the desired shape and dimension to form a cylinder. The cylinder is cooled after extrusion. The dimensions of the cylinder can be varied to accommodate the core. The inner diameter of the cylinder can be configured to conform to the desired circumferential dimension of the preformed, pre-pressed core, which contains the therapeutic agent(s). The thickness of the cylinder is determined in part by the polymer/plasticizer type as well its behavior with respect to the external fluid. The bioadhesive nature of the polymer cylinder may also be controlled by mixing different type of polymers and excipients. Inorganic metal oxides may be added to improve the adherence. Pore formers may also be added to control its porosity. Drugs may also be added into the polymer cylinder either as a plasticizer or pore-forming agent. Adding drug to the bioadhesive layer is commonly used to increase porosity (poreformer). Some drugs are small molecules that act as plasticizers. For example, D-DOPA can behave as a plasticizer for D-DOPA-BMA.

Prior to hot-melt extrusion of the hollow cylinder, the bioadhesive polymer, optionally along with a plasticizer in a range from 0.1 to 50% (w/w), preferably 20% (w/w), is mixed in a planetary mixer. Extrusion is performed using either any standard extruder, such as MP 19 TC25 laboratory scale co-rotating twin screw extruded of APV Baker (Newcastle-under-Lyme, UK) or a Killion extruder (Killian extruder Inc., Cedar Grove, N.J.). The extruder is typically equipped with a standard screw profile with two mixing sections, an annual die with metal insert for the production of the cylinder and twin screw powder feeder. Typical extrusion conditions are: a screw speed of 5 rpm, a powder feed rate of 0.14 kg/hr and a temperature profile of 125-115-105-80-65° C. from the powder feeder towards the die. The cylinders (typically with an internal diameter of 7 mm and a wall thickness of 1 mm) are typically cut into 1 cm long cylinders.

2. Method for Production of the Inner Core System

Inner longitudinally compressed core tablets containing the therapeutic agent, and optionally other components, are compressed onto a single or multilayer tableting machine equipped with deep fill or regular tooling. For example, the therapeutic agent, either alone or in combination with a rate controlling polymer and optionally other excipients, is mixed by stirring, ball milling, roll milling or calendaring, and pressed into a solid having dimensions conforming to an internal compartment defined by the extruded polymer cylinder. One or more layers containing different therapeutic agents can be included as a multilayer tablet. The core may be a pre-fabricated insert with a semi-permeable layer on the outside of the core to form an "osmotic system" which is inserted into the bioadhesive cylinder with orifices aligned along the open ends of the cylinder.

3. Method of Insertion of the Core into the Bioadhesive Cylinder

The core, which is preferably in the form of a longitudinally compressed tablet, is inserted into the cylinder and the core and the cylinder, which forms the outer coating, are fused together to produce a solid oral dosage form. The preformed inner core with a diameter slightly smaller than the inner diameter of the cylinder is either manually or mechanically inserted into the cylinder and heated to fuse the two units. Alternately, the core insertion into the cylinder may also be done by a positive placement core insertion mechanism on the tableting machine. Initially, the extruded cylinder may be placed into the die of the machine followed by insertion of the compressed core into the internal compartment of the cylinder and the two components compressed to get the finished dosage form. Alternatively, the dosage form is prepared via simultaneous extrusion of the bioadhesive cylinder and expandable inner composition using an extruder capable of such an operation.

c. Administration of Bioadhesive Materials to Patients

The bioadhesive materials may be administered as dry powders in a suspension or in an ointment to the mucosal membranes, via the nose, mouth, rectum, or vagina. Pharmaceutically acceptable carriers for oral or topical administration are known and determined based on compatibility with the polymeric material. Other carriers include bulking agents such as METAMUCIL™. The bioadhesive material may be in a matrix or form a coating in a drug or diagnostic composition which may be administered to a patient by a variety of methods, including transdermal, oral, nasal, vaginal, rectal, ocular, buccal, periodontal, subcutaneous, intramuscular, intraperitoneal, enteral infusion to various GI sites, and intravitreal administration. The material may be administered via inhalation, optionally to deliver the drug formulation to the deep lung.

The bioadhesive material can be used as an adhesive, such as a dental adhesive, a bone cement or glue, a synthetic skin or a wound dressing, a skin plaster or film. These materials can be applied directly to the site in need of treatment.

In one embodiment, the bioadhesive material is a layer in an oral dosage formulation, such as a tablet, optionally a controlled release oral dosage formulation. A patient swallows the oral dosage formulation.

These bioadhesive materials are especially useful for treatment of inflammatory bowel diseases such as ulcerative colitis and Crohn's disease. In ulcerative colitis, inflammation is restricted to the colon, whereas in Crohn's disease, inflammatory lesions are often found throughout the gastrointestinal tract, from the mouth to the rectum. Sulfasalazine is one of the drugs that is used for treatment of the above diseases. Sulfasalazine is cleaved by bacteria within the colon to sulfapyridine, an antibiotic, and to 5-aminosalicylic acid, an anti-inflammatory agent. The 5-aminosalicylic acid is the active drug and is active locally. Direct administration of the degradation product (5-aminosalicylic acid) may be more beneficial. A bioadhesive drug delivery system can improve the therapy by retaining the drug for a prolonged time in the intestinal tract. For Crohn's disease, retention of 5-aminosalicylic acid in the upper intestine is of great importance; since bacteria cleave the sulfasalazin in the colon, the only way to treat inflammations in the upper area of the intestine is by local administration of 5-aminosalicylic acid.

Gastrointestinal Imaging Barium sulphate suspension is the universal contrast medium used for examination of the upper gastrointestinal tract, as described by D. Sutton, Ed., *A Textbook of Radiology and Imaging*, Vol. 2, Churchill Livingstone, London (1980), even though it has undesirable properties, such as unpalatability and a tendency to precipitate out of solution. Several properties are critical: (a) particle size: the rate of sedimentation is proportional to particle size (i.e., the finer the particle, the more stable the suspension; (b) non-ionic medium: charges on the barium sulphate particles influence the rate of aggregation of the particles, aggregation is enhanced in the presence of the gastric contents; and (c) solution pH: suspension stability is best at pH 5.3. However, as the suspension passes through the stomach, it is inevitably acidified and tends to precipitate. The encapsulation of barium sulfate in microspheres of appropriate size provides a good separation of individual contrast elements and may, if the polymer displays bioadhesive properties, help in coating, preferentially, the gastric mucosa in the presence of excessive gastric fluid. With bioadhesiveness targeted to more distal segments of the gastrointestinal tract, it may also provide a kind of wall imaging not easily obtained otherwise.

The double contrast technique, which utilizes both gas and barium sulphate to enhance the imaging process, especially requires a proper coating of the mucosal surface. Air or carbon dioxide must be introduced to achieve a double contrast. This is typically achieved via a nasogastric tube to provoke a controlled degree of gastric distension. Studies indicate that comparable results may be obtained by the release of individual gas bubbles in a large number of individual adhesive microspheres and that this imaging process may be used to image intestinal segments beyond the stomach.

EXAMPLES

Example 1

Comparison of Tensile Properties of Various Catechol Grafted Maleic Anhydride Copolymers with and without L-DOPA Methods:

The polymers were grafted with either L-DOPA or carbidopa using the route shown schematically in Reaction 1. First, the polymers were dissolved in DMSO, and L-DOPA or carbidopa was added to the solution. The reaction was conducted by gentle heating (70° C.) for 2 hours. During the reaction, the L-DOPA or carbidopa slowly went into solution. After the reaction, the reaction mixture gelled upon cooling to room temperature. The polymer was recovered by extracting the DMSO from the gel with several washes of methylene chloride. The synthesized polymers were dried and stored. Polymers were made with about 1 to 99% molar substitution of the maleic anhydride groups with DOPA or carbidopa.

Testing:

The polymers described above were tested on a Texture Technologies texture analyzer machine. Polymers were applied onto an acorn nut or applied by solvent casting. An "acorn nut" is a rounded cap nut that has female threads in order to cover the end of a screw.

The acorn nuts were singly tested on the texture analyzer and brought into contact with the mucosal side of a flattened section of pig jejunum at a rate of 0.5 mm/second and an applied force of 5 g. The acorn nut was held at this position for 420 seconds and then pulled away at a rate of 0.5 mm/second. The force as a function of distance was plotted on an output graph. The fracture strength and tensile work were calculated form the output graph and corrected for the projected acorn nut surface area.

In a variant way useful to test the underwater adhesion (the "Wet Method"), samples were tested in a small chamber where the pig jejunum tissue was anchored to the bottom of the chamber, and the coated acorn nuts were brought into contact with the tissue while both were submerged in phosphate buffered saline (PBS, pH=7.3-7.5).

The fracture strength and tensile work test results of the carbidopa grafted polymer against controls are illustrated in Table 1.

TABLE 1

Fracture Strength and Tensile Work of Carbidopa grafted Polymers Against the Control Materials

| Testing Material | Test Method | Fracture Strength (mN/cm$^2$) | Tensile Work (nJ) |
|---|---|---|---|
| Carbidopa grafted poly(butadiene-co-maleic anhydride) | Dry | 740 | 119,000 |
| Control - Acorn only | Dry | 72 | 1,500 |
| Control - poly(butadiene-co-maleic anhydride) | Dry | 96 | 2,700 |
| Control - Carbopol ™ | Dry | 354 | 42,000 |
| Control - Carbopol ™ | Wet | 200 | 9,200 |
| Control - L-DOPA grafted poly(butadiene-co-maleic anhydride) | Dry | 280 | 28,900 |

The test results showed the superior bioadhesion property of carbidopa grafted poly(butadiene-co-maleic anhydride) when compared with Carbopol or L-DOPA grafted poly(butadiene-co-maleic anhydride) in both tensile work and fracture strength. Carbidopa grafted polymer exhibited 200% greater fracture strength than the Carbopol. When compared with the tensile work, carbidopa grafted polymer was thirty times better than Carbopol. Meanwhile, Carbopol's bioadhesion property decreased significantly when it was tested under "wet" conditions.

Figure 11:
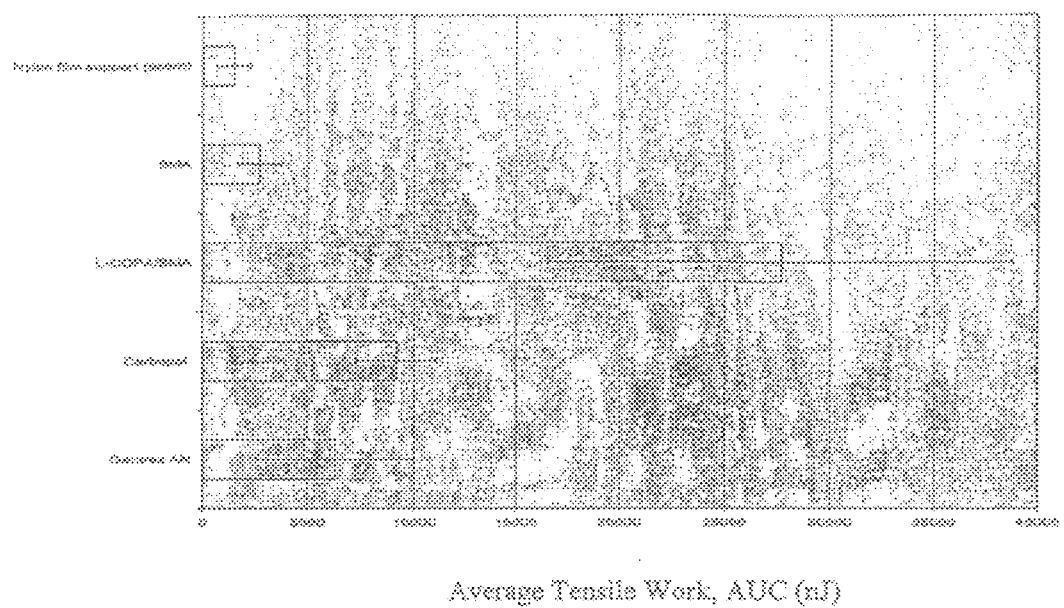
FIG. 11 is a bar graph showing the fracture strength of bonds ($mN/cm^2$) formed with the bioadhesive material poly (butadiene-co-maleic anhydride)-carbidopa as compared to the poly(butadiene-co-maleic anhydride) and poly(butadiene-co-maleic anhydride)-DOPA.
Figure 12:
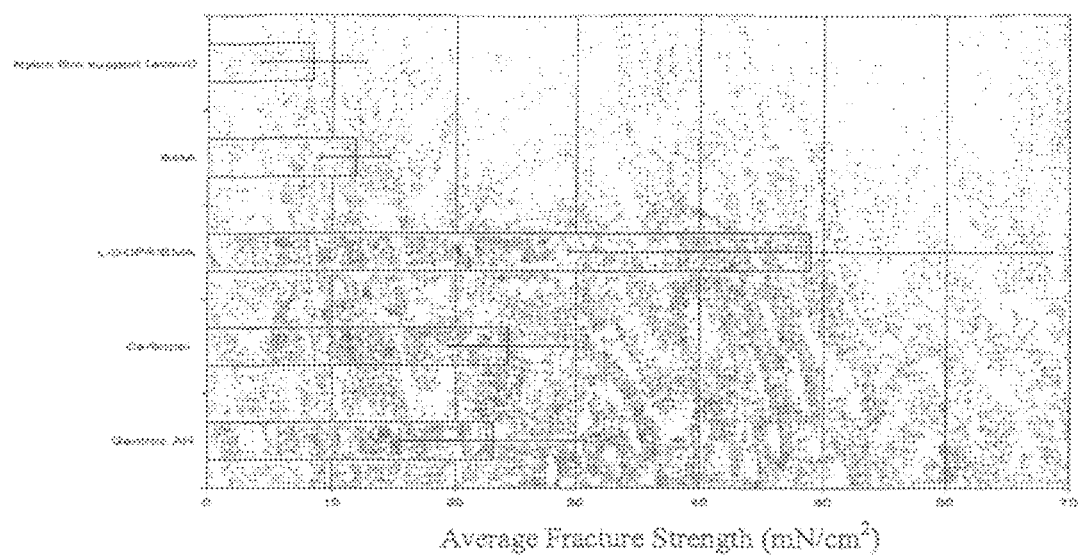
FIG. 12 is a bar graph of the tensile work (nJ) required to rupture the bonds formed with the bioadhesive material poly (butadiene-co-maleic anhydride)-carbidopa as compared to poly(butadiene-co-maleic anhydride) and poly(butadiene-co-maleic anhydride)-DOPA.

FIGS. 11 and 12 compare the fracture strength of and the tensile work performed by the carbidopa grafted polymer with other polymers.

Example 2

Comparison of Racemic Mixture Vs. Pure Isomeric Form of Catechol Grafted Polymer Two different compounds DOPA containing compounds were synthesized, L-3,4-dihydroxyphenylalanine (L-DOPA) and a (50:50) racemic mixture of D,L-3,4-dihydroxyphenylalanine (DL-DOPA). L-DOPA and DL-DOPA were each grafted onto a Butadiene Maleic Anhydride backbone. Approximately 95% of the monomers were substituted with L-DOPA or DL-DOPA. The mucoadhesion of both the L-DOPA and DL-DOPA polymers was tested using a Stable Micro Systems Texture Analyzer and an experimental setup known to those skilled in the art. Six samples for each polymer were tested. The mean fracture strength of the DL-DOPA-BMA polymer was 0.0139 N, with a standard deviation of 0.0090 N. The mean fracture strength of the L-DOPA-BMA polymer was 0.0134 N, with a standard deviation of 0.0042 N. The mean total tensile work for the DL-DOPA-BMA polymer was 0.0045 nJ, with a standard deviation of 0.0023 nJ. The mean tensile work for the L-DOPA-BMA polymer was 0.005 nJ, with a standard deviation of 0.0018 nJ. There was no statistical difference between either the peak detachment force or the total tensile work associated with each polymer.

Example 3

Carbidopa-Levodopa Formulations

Levodopa with carbidopa (peripheral decarboxylase inhibitor) remains the cornerstone for treatment of Parkinson's disease. There is a good correlation between plasma levodopa concentrations and the clinical response. The gastrointestinal absorption behavior of orally administered levodopa depends on gastrointestinal transit rates as absorption occurs mainly in the proximal third of the small intestine (duodenum/jejunum). Therefore, the gastrointestinal transit rate is a determining factor for the access to an orally administered levodopa/carbidopa formulation. As gastric emptying is highly variable, a gastro-retentive system utilizing an effective and longer lasting bioadhesive polymer will allow the levodopa/carbidopa to remain available at the target absorption site over an extended duration and thereby maintain effective plasma levels for longer duration. Following examples demonstrate the usefulness of particular bioadhesive polymers in maintaining the levodopa-carbidopa oral formulation at the desired absorption site and thereby achieve improved bioavailability, reduced variability as well as maintain effective plasma levels to reduce the "on-off" or wearing off swings.

A multiparticulate based extended release capsule formulation of levodopa-carbidopa (200 mg/50 mg) consisting of carbidopa granules, levodopa pellets, and bioadhesive polymer Spheromer™ IV-coated levodopa-carbidopa pellets was prepared and its in vivo pharmacokinetic performance was compared with that of a marketed levodopa-carbidopa controlled-release formulation, Sinemet® CR 50-200, in fed beagle dogs. Spheromer™ IV is a butadiene maleic anhydride copolymer grafted with carbidopa, and is represented by the following structure:

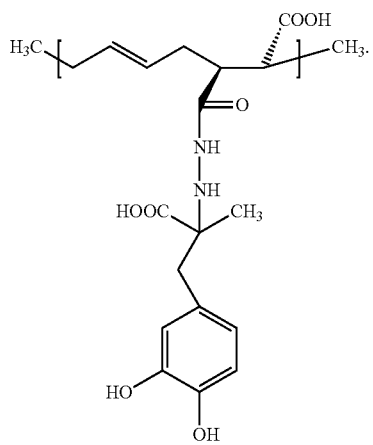

Examples 3A to 3E describe the methods of preparation of levodopa-carbidopa multiparticulate based extended release capsule formulation. Examples 3F and 3G present the in vitro dissolution and in vivo pharmacokinetic performance of levodopa-carbidopa multiparticulate based ER capsules and Sinemet® CR 50-200 tablets, respectively.

Example 3A

Production of Carbidopa Granules with Low Shear Granulation

Carbidopa granules were produced with low shear granulation method. Carbidopa and Ludipress®, (a co-processed mixture of povidone, crospovidone, and lactose monohydrate) were blended together in a planetary type Hobart Mixer equipped with a 5-qt mixing bowl at the speed setting #1, for 5 min. The dry mix was subsequently granulated with aqueous solution of povidone (5% w/v). The granulation was dried in a conventional Precision oven at 50° C. until the desired moisture content of 0.8% was achieved The dried granules were screened through a stack of stainless steel sieves, U.S. standard mesh sizes 20 and 60, using a mechanical sieve shaker, W.S. Tyler Sieve Shaker Ro-Tap Rx-29, operated for 5 min. The particle size and distribution of granular formulations were analyzed, and granules ranging from 0.25 mm (mesh #60) to 0.85 mm (mesh #20) were selected for further processing. The dry weight and composition of granules are given in Table 2.

TABLE 2

Dry Weight and Composition of Carbidopa Granules

| Ingredients | % w/w | Weight (g) |
|---|---|---|
| Carbidopa monohydrate, USP | 24.7 | 50.0 |
| Ludipress | | |
| Povidone, USP | 2.6 | 5.3 |
| Crospovidone, USP | 2.6 | 5.3 |
| Lactose Monohydrate, Ph Eur | 68.9 | 139.4 |
| Povidone (Plasdone ® K-25), USP | 1.2 | 2.4 |
| Total | 100.0 | 202.4 |

Example 3B

Production of Levodopa Pellets with Granulation-Extrusion-Spheronization

Levodopa pellets were produced by the granulation-extrusion-spheronization method consisting of the following processes: Levodopa and excipients were initially blended in a planetary type mixer, Hobart Mixer equipped with a 5-qt mixing bowl, operating at the speed setting #1, for 5 minutes. The dry blend was subsequently granulated with hydroxypropyl cellulose binder solution. The wet granulation was passed through the screen of a screen-type extruder, Caleva Model 25 Extruder, operating at 15 rpm using a screen with 1.5 mm aperture. The extruded strands were then passed through a spheronizer, Caleva Model 250, equipped with a 2.5-mm spheronization plate, operating at 1250 rpm for 5 min, to form spheronized pellets. Spheronized pellets were dried in a conventional Precision oven maintained at 50° C. until the desired moisture content of 0.4% was attained.

The dried pellets were screened through a stack of stainless steel sieves, U.S. standard mesh sizes 10, 12, 14, 16, and 18 using a mechanical sieve shaker, W.S. Tyler Sieve Shaker Ro-Tap Rx-29, operated for 5 min. The particle size and distribution of pellet formulations were analyzed, and pellets ranging from 10 mm (mesh #18) to 2.0 mm (mesh #10) were selected for further processing. The dry weight and composition of pellets are given in Table 3.

TABLE 3

Dry Weight and Composition of Levodopa Pellets,

| Ingredients | % w/w | Weight (g) |
|---|---|---|
| Levodopa, USP | 50.0 | 200.0 |
| Macrocrystalline cellulose (Emcocel ® 90M), NF | 25.0 | 100.0 |
| Mannitol (Mannogem ™ Powdered), USP | 14.0 | 56.0 |
| Hydroxypropylcellulose (HPC-SSL), NF | 5.0 | 20.0 |
| Croscarmellose sodium (Ac-Di-Sol ®), NF | 5.0 | 20.0 |
| Citric acid, anhydrous, USP | 1.0 | 4.0 |
| Total | 100.0 | 400.0 |

Example 3C

Production of Levodopa-Carbidopa (4:1) Pellets with Granulation-Extrusion-Spheronization Levodopa-carbidopa pellets were produced with the granulation-extrusion-spheronization method consisting of the following processes: Levodopa, carbidopa and excipients were initially blended in a planetary type mixer, Hobart Mixer with a 5-qt mixing bowl, operating at the speed setting #1, for 5 minutes. The dry blend was subsequently granulated with purified water. The wet granulation is passed through the screen of a screen-type extruder, Caleva Model 25 Extruder, operating at 15 rpm using a screen with 1.5 mm aperture. The extruded strands were then passed through a spheronizer, Caleva Model 250, equipped with a 2.5-mm spheronization plate, operating at 1250 rpm for 5 min, to form spheronized pellets. Spheronized pellets were dried in a conventional Precision oven maintained at 50° C. until the desired moisture content of 1.0% was attained.

The dried pellets were screened through a stack of stainless steel sieves, U.S. standard mesh sizes 10, 12, 14, 16, and 18 using a mechanical sieve shaker, W.S. Tyler Sieve Shaker Ro-Tap Rx-29, operated for 5 min. The particle size and distribution of pellet formulations were analyzed, and pellets ranging from 1.0 mm (mesh #18) to 2.0 mm (mesh #10) were selected for further processing. The dry weight and composition of pellets are given in Table 4.

TABLE 4

Dry Weight and Composition of Levodopa-Carbidopa Pellets

| Ingredients | % w/w | Weight (g) |
| --- | --- | --- |
| Levodopa, USP | 48.3 | 100.0 |
| Carbidopa monohydrate, USP | 13.0 | 27.0 |
| Macrocrystalline cellulose (Emcocel ® 90M), NF | 26.6 | 55.0 |
| Crospovidone (Polyplasdone ® XL), USP | 5.8 | 12.0 |
| Povidone (Plasdone ® K-25), USP | 3.4 | 7.0 |
| Citric acid, anhydrous, USP | 2.9 | 6.0 |
| Total | 100.0 | 207.0 |

Example 3D

Spheromer™ IV Coated Levodopa-Carbidopa Pellets 50 g of levodopa-carbidopa pellets (from Example 3C) were film-coated with bioadhesive Spheromer™ IV polymer in a Vector MFL.01 Micro Batch Fluid Bed System, equipped with a Wurster insert. The fluid bed system was operated at inlet air flow rate of 100 lpm (liter per minute) and temperature of 35-40° C. The composition of the coating solution is given in Table 5. Spheromer™ IV and Poloxamer 188 (Lutrol® F68) were dissolved in a mixture of methyl alcohol and water and sprayed onto the fluidized pellets to obtain a 6% weight gain on pellets.

TABLE 5

Composition of Spheromer ™ IV Coating Solution

| Ingredients | Weight % | Weight (g) |
| --- | --- | --- |
| Spheoromer ™ IV | 95 | 2.90 |
| Poloxamer 188 (Lutrol ® F68), NF | 5 | 0.15 |
| Methyl alcohol, NF | * | (75 mL) |
| Purified Water, HPLC Grade | * | (25 mL) |
| Total Solids | 100 | 3.05 |

* Methyl alcohol and water were removed during the coating/drying process.

Example 3E

Preparation of Levodopa-Carbidopa 200 mg/50 mg Multiparticulate Based Capsules Carbidopa granules (from Example 3A), levodopa pellets (from Example 3B), and Spheromer™ IV-coated levodopa-carbidopa pellets (from Example 3D) were encapsulated in 00-size hard gelatin capsules. Each capsule contained 200 mg levodopa and 50 mg carbidopa anhydrous. The composition of encapsulated multiparticulates is given in Table 6.

TABLE 6

Composition (mg) of Levodopa-Carbidopa Multiparticulate Based Extended Release Capsule Formulation

| Components | Wt. (mg) |
| --- | --- |
| Carbidopa Granules | 40 |
| Levodopa Pellets | 80 |
| Spheromer ™ IV-coated Levodopa-Carbidopa Pellets | 348 |
| Total (mg per capsule) | 468 |

Example 3F

Figure 13:
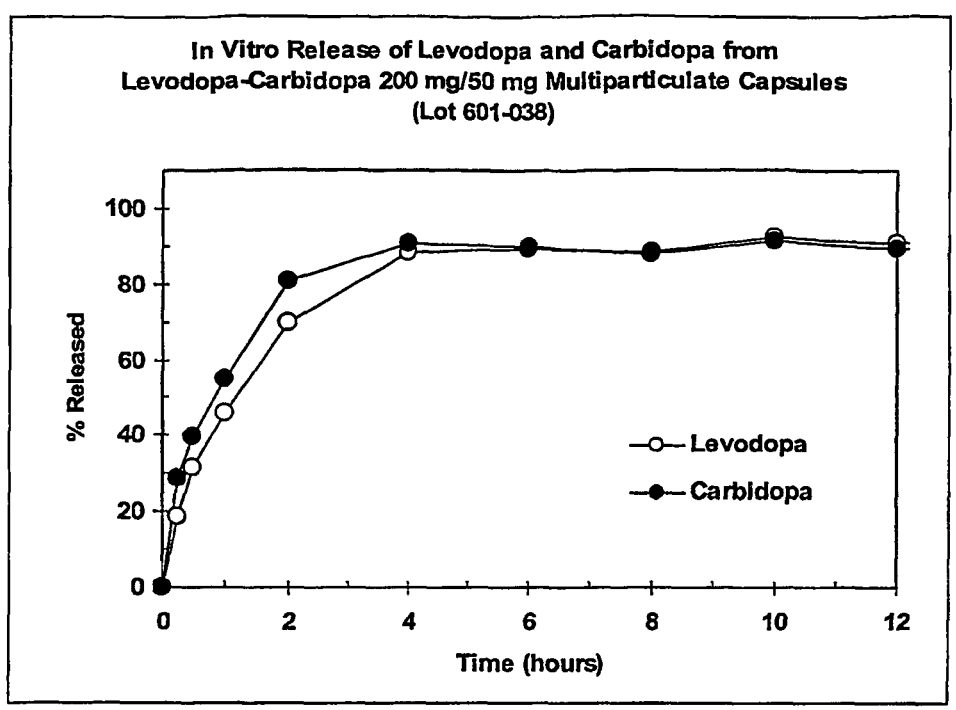
FIG. 13 shows the in vitro dissolution profiles of levodopa and carbidopa for levodopa-carbidopa 200 mg/50 mg multiparticulate capsules in 0.1 N HCl.

In Vitro Dissolution and In Vivo Pharmacokinetic Performance of Levodopa-Carbidopa 200 mg/50 mg Multiparticulate Based Capsules The in vitro dissolution profile of levodopa-carbidopa extended release capsules (from Example 3E), containing 200 mg levodopa and 50 mg carbidopa was obtained under simulated gastric conditions. The dissolution tests were performed in 900 mL of a 0.1 N HCl-pH 1.2 solution in a USP II apparatus at a temperature of 37° C. The paddle speed was set at 50 rpm. Samples of dissolution media were collected at predetermined intervals and analyzed by HPLC. The dissolution profiles of levodopa and carbidopa obtained from HPLC analysis are shown in FIG. 13.

Figure 14:
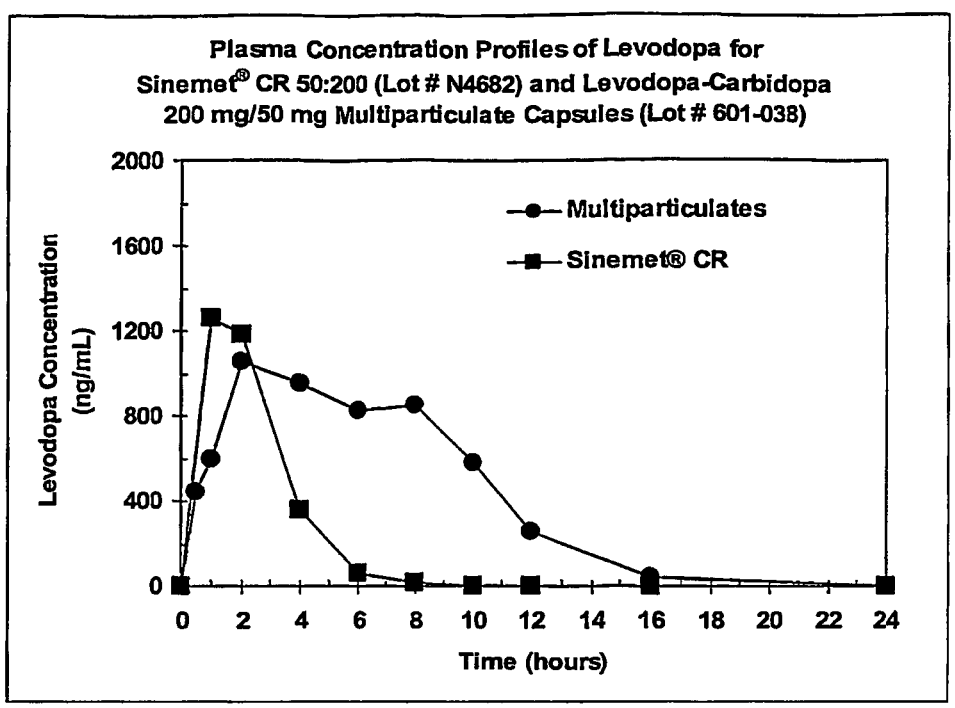
FIG. 14 shows the plasma concentration profiles of levodopa in fed beagle dogs for Sinemet® CR 50-200 Tablets and levodopa-carbidopa 200 mg/50 mg multiparticulate extended release capsules.
Figure 15:
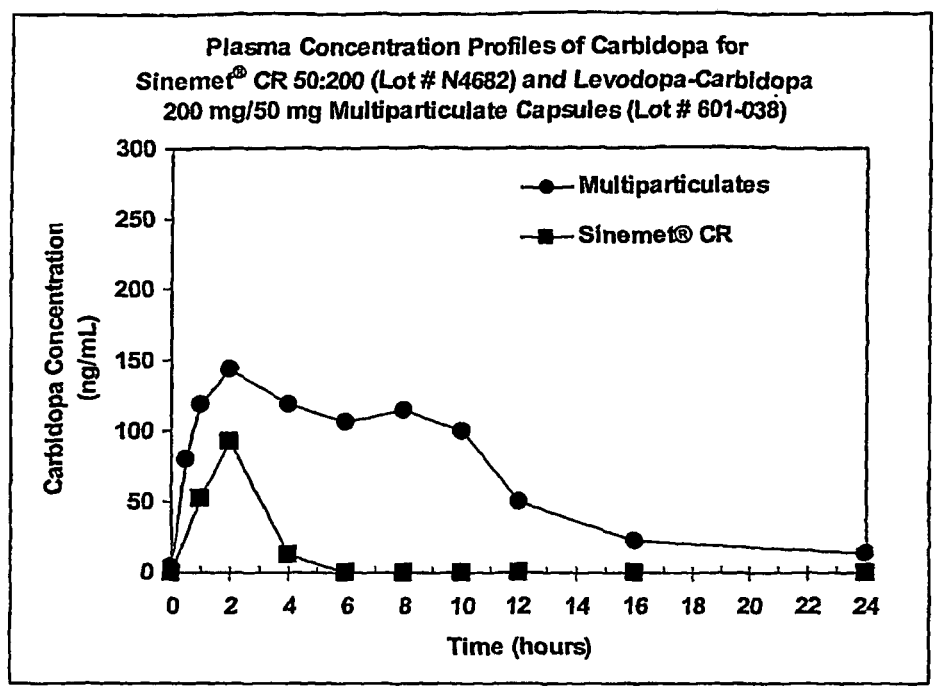
FIG. 15 shows the plasma concentration profiles of carbidopa in fed beagle dogs for Sinemet® CR 50-200 Tablets and levodopa-carbidopa 200 mg/50 mg multiparticulate extended release capsules.
Figure 16:
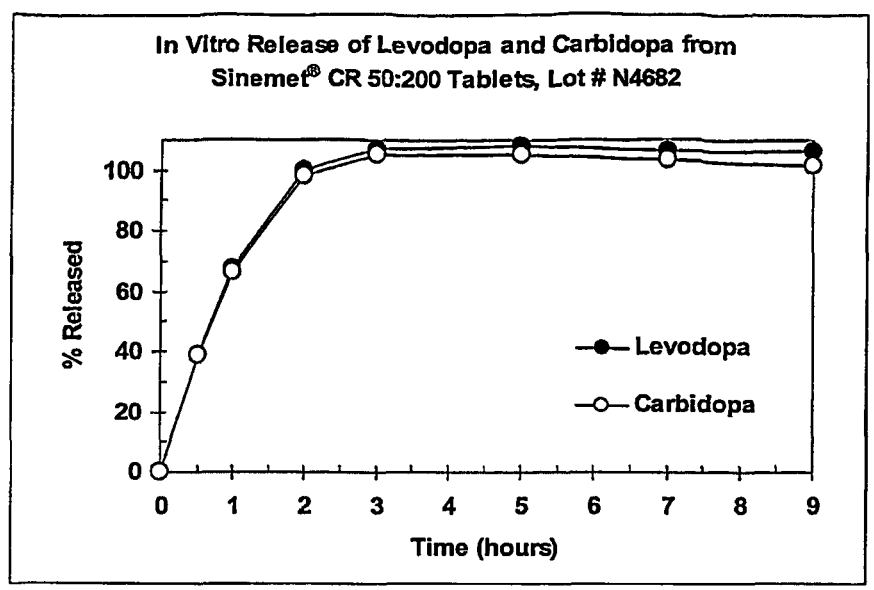
FIG. 16 shows the in vitro dissolution profiles of levodopa and carbidopa for Sinemet® CR Tablets in 0.1 N HCl

The in vivo performance of levodopa-carbidopa extended release capsules and Sinemet® CR tablets was evaluated in beagle dogs. The capsules were administered to separate cohorts of twelve beagle dogs in the fed state. Plasma levels of levodopa and carbidopa were measured using LC/MS/MS analysis. FIGS. 14 and 15 show the plasma concentration profiles of levodopa and carbidopa in the fed state, respectively. The pharmacokinetic data including the area under the plasma levodopa vs. time curve (AUC), maximum concentration ($C_{max}$) and time required to achieve $C_{max}$ ($T_{max}$) are provided in Table 7.

37

TABLE 7

Pharmacokinetic Data for Levodopa-Carbidopa Multiparticulate Extended Release Capsules in Fed Beagle Dogs; the area under the plasma levodopa vs. time curve (AUC), maximum concentration ($C_{max}$), and time required to achieve $C_{max}$ ($T_{max}$)

| Fasting Period | AUC (ng/ml · hr) | $C_{max}$ (ng/ml) | $T_{max}$ (hr) |
|---|---|---|---|
| Fed State | 9,649 | 1,615 | 3.8 |

Example 3G

In Vitro Dissolution and In Vivo Pharmacokinetic Performance of Sinemet® CR 50-200 Tablets, Containing 50 mg Carbidopa and 200 mg Levodopa The in vitro dissolution profile of Sinemet® CR 50-200 tablets, containing 50 mg carbidopa and 200 mg levodopa were obtained under simulated gastric conditions. The dissolution tests were performed in 900 mL of a 0.1 N HCl-pH 1.2 solution, in a USP II apparatus at a temperature of 37° C. The paddle speed was set at 50 rpm. Samples of dissolution media were collected at predetermined intervals and analyzed by HPLC. The dissolution profiles of levodopa and carbidopa obtained from HPLC analysis are shown in FIG. 13.

The in vivo pharmacokinetic performance of Sinemet® CR 50-200 tablets was evaluated in beagle dogs. Sinemet® CR tablets were administered to cohorts of six beagle dogs in the fed state and plasma levels of levodopa and carbidopa were measured using HPLC analysis. FIGS. 14 and 15 show the plasma concentration profiles of levodopa and carbidopa. The pharmacokinetic data including the area under the plasma levodopa vs. time curve (AUC), maximum concentration ($C_{max}$) and time required to achieve $C_{max}$ ($T_{max}$) are provided in Table 8.

TABLE 8

Pharmacokinetic Data for Sinemet ® CR 50-200 Tablets in Fed Beagle Dogs; the area under the plasma levodopa vs. time curve (AUC), maximum concentration ($C_{max}$), and time required to achieve $C_{max}$ ($T_{max}$)

| Formulation | AUC (ng/ml · hr) | $C_{max}$ (ng/ml) | $T_{max}$ (hr) |
|---|---|---|---|
| Sinemet ® CR 50-200 Tablets | 3,903 | 1,663 | 2 |

Clearly, the Spheromer IV coated levodopa-carbidopa multiparticulate beads demonstrated significantly improved levodopa and carbidopa bioavailability compared to reference controlled release product Sinemet® CR tablets. This improvement was primarily due to Spheromer IV bioadhesive polymer coating that increased the residence time of levodopa in the GI tract.

It is understood that the disclosed invention is not limited to the particular methodology, protocols, and reagents described as these may vary. It is also to be understood that the terminology used herein is for the purpose of describing particular embodiments only, and is not intended to limit the scope of the present invention which will be limited only by the appended claims.

Those skilled in the art will recognize, or be able to ascertain using no more than routine experimentation, many equivalents to the specific embodiments of the invention described herein. Such equivalents are intended to be encompassed by the following claims.

38

We claim:

1. A bioadhesive polymer comprising a polymer backbone comprising repeat units represented by one of the following structural formulae:

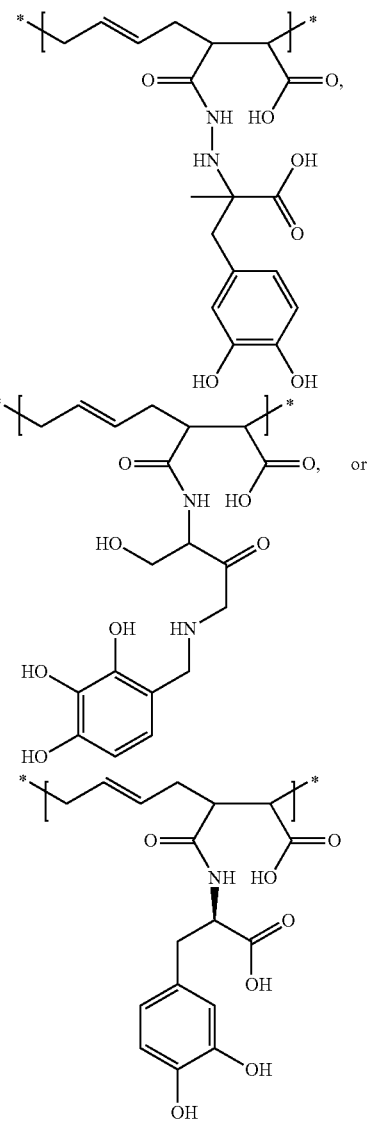

wherein the polymer backbone is functionalized with residues of at least one compound comprising:
   a) an aromatic moiety comprising two or more hydroxyl substituents, methoxy substituents, substituents hydrolyzable to hydroxyl substituents, or a combination thereof; and
   b) a primary or secondary amino moiety;
wherein the blood-brain barrier is substantially impermeable to the at least one compound; or
a bioadhesive composition comprising a blend of a polymer comprising repeat units represented by one of the following structural formulae:

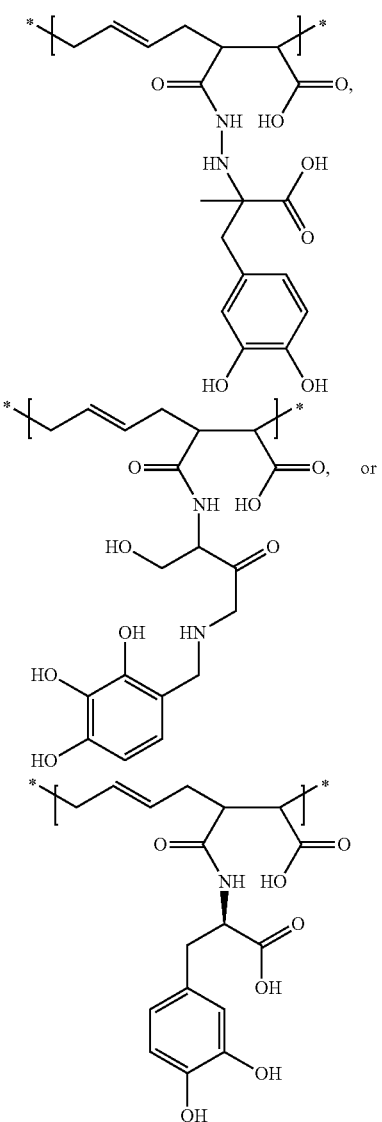

and one or more compounds comprising:
  a) an aromatic moiety comprising two or more hydroxyl substituents, methoxy substituents, substituents hydrolyzable to hydroxyl substituents, or a combination thereof; and
  b) a primary or secondary amino moiety;
wherein the blood-brain barrier is substantially impermeable to the at least one or more compounds.

2. The polymer or composition of claim 1, further characterized by one or more of:
  the at least one compound or the one or more compounds comprises D-3,4-dihydroxyphenylalanine;
  the at least one compound or the one or more compounds comprises D-carbidopa, L-carbidopa or a mixture thereof;
  the at least one compound or the one or more compounds comprises D-benserazide, L-benserazide or a mixture thereof;
  the aromatic moiety is a monocyclic moiety comprising two or more hydroxyl substituents or substituents hydrolyzable to hydroxyl substituents;
  the aromatic moiety is a phenyl moiety comprising two or more hydroxyl substituents or substituents hydrolyzable to hydroxyl substituents;
  the aromatic moiety is a phenyl moiety comprising three or more hydroxyl substituents or substituents hydrolyzable to hydroxyl substituents;
  the aromatic moiety is catechol;
  the amino moiety is attached directly to a carbon atom;
  the amino moiety is part of a hydrazinyl moiety;
  at least 1% of the repeat units in the polymeric backbone are functionalized with residues of the at least one compound; and
  at least 50% of the repeat units in the polymeric backbone are functionalized with residues of the at least one compound.

3. The polymer or composition of claim 1 or 2, further comprising one or more of:
  a bioadhesive modifier;
  a plasticizer; and/or
  a therapeutic, prophylactic, or diagnostic agent.

4. A method for forming a bioadhesive polymer, comprising reacting a polymer comprising repeat units represented by one of the following structural formulae:

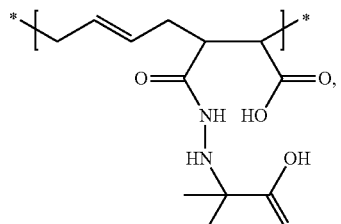

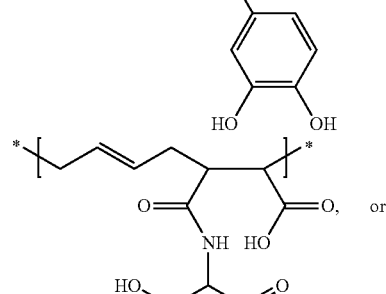

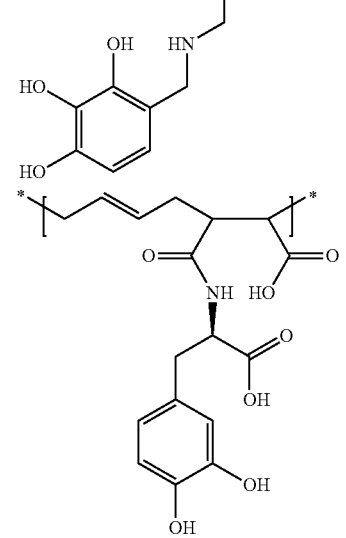

capable of reacting with a primary or secondary amino moiety with at least one or more compounds comprising:

a) an aromatic moiety comprising two or more hydroxyl substituents, methoxy substituents, substituents hydrolyzable to hydroxyl substituents, or a combination thereof; and
b) a primary or secondary amino moiety;
wherein the blood-brain barrier is substantially impermeable to the at least one or more compounds; or
a method for forming a bioadhesive polymer, comprising reacting a monomer comprising repeat units represented by one of the following structural formulae:

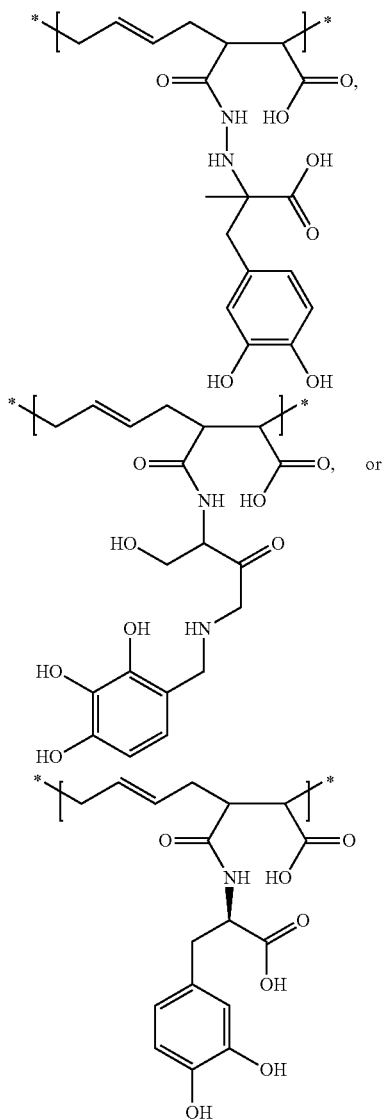

capable of reacting with a primary or secondary amino moiety with one or more compounds comprising:
a) an aromatic moiety comprising two or more hydroxyl substituents, methoxy substituents, substituents hydrolyzable to hydroxyl substituents, or a combination thereof; and
b) a primary or secondary amino moiety;
wherein the blood-brain barrier is substantially impermeable to the at least one or more compounds; and
polymerizing the monomer.

5. A method of prolonging contact of a pharmaceutical composition with a tissue, comprising contacting the pharmaceutical composition with a bioadhesive polymer comprising a polymer backbone comprising repeat units represented by one of the following structural formulae:

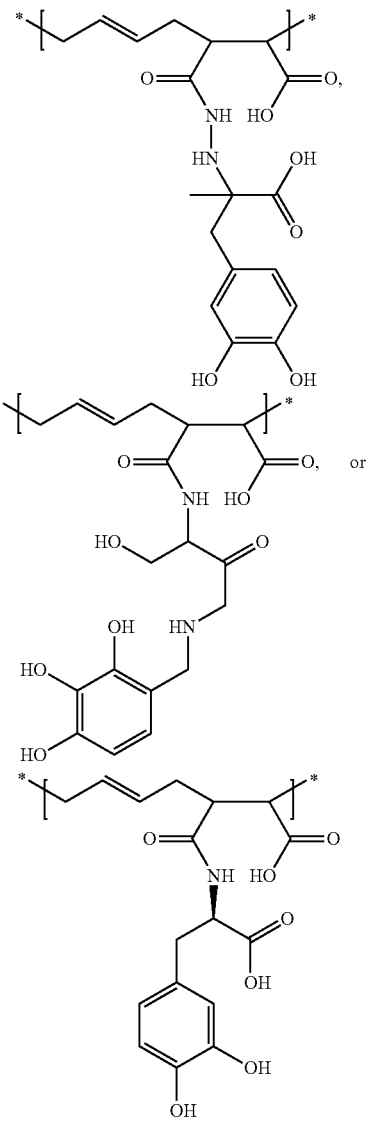

wherein the polymer backbone is functionalized with residues of at least one or more compounds comprising:
a) an aromatic moiety comprising two or more hydroxyl substituents, methoxy substituents, substituents hydrolyzable to hydroxyl substituents, or a combination thereof; and
b) a primary or secondary amino moiety;
wherein the blood-brain barrier is substantially impermeable to the at least one or more compounds;
wherein all or a fraction of the bioadhesive polymer contacts the tissue; or
a method of prolonging contact of a pharmaceutical composition with a tissue, comprising contacting a pharmaceutical composition with a bioadhesive composition including a blend of a polymer comprising repeat units represented by one of the following structural formulae:

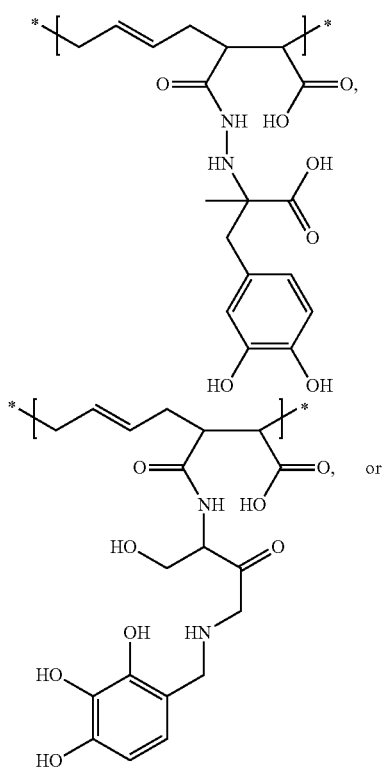

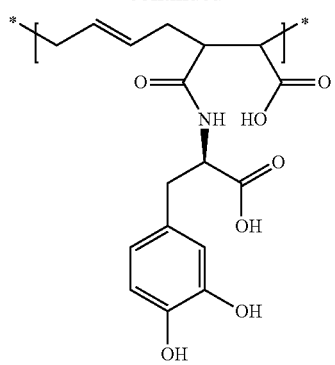

and at least one or more compounds comprising:

a) an aromatic moiety comprising two or more hydroxyl substituents, methoxy substituents, substituents hydrolyzable to hydroxyl substituents, or a combination thereof; and b) a primary or secondary amino moiety;

wherein the blood-brain barrier is substantially impermeable to the at least one or more compounds.

6. The method of claim 5, wherein the pharmaceutical composition is in the form of a tablet or capsule or a powder and/or is coated with the bioadhesive polymer.

\* \* \* \* \*